United States Patent
Azetsu et al.

(10) Patent No.: US 11,293,876 B2
(45) Date of Patent: Apr. 5, 2022

(54) FLUID MEASUREMENT METHOD, FLUID MEASUREMENT DEVICE, AND MEASUREMENT SYSTEM

(71) Applicants: TOKAI UNIVERSITY EDUCATIONAL SYSTEM, Tokyo (JP); KANOMAX JAPAN INC., Osaka (JP)

(72) Inventors: Akihiko Azetsu, Kanagawa (JP); Ikkei Kitajima, Kanagawa (JP); Kazaki Kuratsuji, Kanagawa (JP); Masayuki Ochiai, Kanagawa (JP)

(73) Assignees: TOKAI UNIVERSITY EDUCATION SYSTEM, Tokyo (JP); KANOMAX JAPAN INC., Osaka (JP)

(*) Notice: Subject to any disclaimer, the term of this patent is extended or adjusted under 35 U.S.C. 154(b) by 17 days.

(21) Appl. No.: 16/627,011

(22) PCT Filed: May 18, 2018

(86) PCT No.: PCT/JP2018/019417
§ 371 (c)(1),
(2) Date: Dec. 27, 2019

(87) PCT Pub. No.: WO2019/003715
PCT Pub. Date: Jan. 3, 2019

(65) Prior Publication Data
US 2020/0225167 A1    Jul. 16, 2020

(30) Foreign Application Priority Data

Jun. 29, 2017 (JP) .............................. JP2017-127827

(51) Int. Cl.
*G01N 21/85* (2006.01)
*G01N 21/31* (2006.01)
(Continued)

(52) U.S. Cl.
CPC .......... *G01N 21/85* (2013.01); *G01N 21/314* (2013.01); *G01N 21/33* (2013.01); *G01N 21/63* (2013.01);
(Continued)

(58) Field of Classification Search
CPC ............ G01B 11/06; G01N 2021/634; G01N 21/314; G01N 21/33; G01N 21/63; G01N 21/631; G01N 21/85; G01P 13/0006
(Continued)

(56) References Cited

U.S. PATENT DOCUMENTS

| | | | | |
|---|---|---|---|---|
| 5,034,613 A | * | 7/1991 | Denk ................. | G01N 21/6428 250/458.1 |
| 5,936,016 A | * | 8/1999 | Lareginie ............... | G03C 1/685 524/94 |

(Continued)

FOREIGN PATENT DOCUMENTS

| | | |
|---|---|---|
| EP | 2524812 | 5/2012 |
| JP | 2003177492 | * 12/2001 |

(Continued)

OTHER PUBLICATIONS

Flow Visualization of Two-Phase Flows Using Photochromic Dye Activation Method, Nuclear Engineering and Design, 1993, vol. 141, p. 343-355.

(Continued)

*Primary Examiner* — Sunghee Y Gray
(74) *Attorney, Agent, or Firm* — Skinner and Associates; Joel D. Skinner, Jr.

(57) ABSTRACT

A measurement method for visualizing the flow of a fluid that includes: a preparation process where a photochromic compound, whose amount of absorption of light changes upon irradiation with transformation-inducing light, is dissolved in the fluid; a transformation-inducing irradiation (Continued)

process where the fluid is irradiated with transformation-inducing light that causes photochromism; and a post-transformation imaging process where an image of the fluid is taken after irradiation by the transformation-inducing light. During the post-transformation imaging process, a first image is generated by taking an image of the fluid by using first light in the first wavelength range in which the amount of absorption of light changes upon irradiation with transformation-inducing light.

6 Claims, 19 Drawing Sheets

(51) Int. Cl.
G01N 21/33 (2006.01)
G01N 21/63 (2006.01)
G01P 13/00 (2006.01)

(52) U.S. Cl.
CPC .... *G01P 13/0006* (2013.01); *G01N 2021/634* (2013.01)

(58) Field of Classification Search
USPC .......................................... 356/436
See application file for complete search history.

(56) References Cited

U.S. PATENT DOCUMENTS 5,975,696 A * 11/1999 Kohan ..................... G02B 5/23
351/159.61
2019/0269333 A1* 9/2019 Bodenschatz .......... A61B 1/303

FOREIGN PATENT DOCUMENTS

| JP | 2004-170369 | 6/2004 |
| JP | 2004-4170369 | 6/2004 |
| JP | 2006-258553 | 9/2006 |

OTHER PUBLICATIONS

Study on Flow Visualization of Oil Film (Photochromism of Oil) Proceedings of the 2015 Annual Meeting of JSMI, The Japan Society of Mechanical Engineers.
Rosli Nurrina Binti, et. al., Measurement of Liquid Sheer Using Tagging Method by Photochromic Dye, Experiments in Fluids, Nov. 18, 2014, pp. 1-15, vol. 55, No. 12, Springer, DE.
Kim J. et. al., A Photochromic Dye Activation Method for Measuring the Thickness of Liquid Films, Measurement. Jul. 1, 2006, pp. 497-504, vol. 39, No. 6, Elsevier, GB.
Moran K. et. al., Instantaneous Hydrodynamics of a Laminar Wavy Liquid Film, International Journal of Multiphase Flow, May 1, 2002, pp. 731-755, vol. 28, No. 5, Pergamon, NL.
Azetsu Akihiko, et. al., Development of a New Visualization Technique Using Photochromism for . . . Int'l of Engine Research, Dec. 19, 2018, pp. 777-787, vol. 20, No. 7, Sage, GB.

* cited by examiner

Image processing process (S6)

Comparison-image capturing process (T5)

Photochromism induction process (S4x)

Fluid-thickness calculation process (S6x)

FLUID MEASUREMENT METHOD, FLUID MEASUREMENT DEVICE, AND MEASUREMENT SYSTEM

TECHNICAL FIELD

The present invention relates to a fluid measurement method, fluid measurement device, and fluid measurement system.

BACKGROUND ART

In general, when a mechanism involves mechanical motion, a fluid such as a lubricant is interposed between members that slide over one another so that a thin film is formed between the members to allow smoothness of motion.

For example, pistons, cylinders, and sliding bearings that require smooth mechanical operation have lubricants inserted between sliding surfaces. For pistons, cylinders, and sliding bearings to operate smoothly, their shape, surface separation at the interface, the quality and amount of lubricant, among others, need to be optimized.

For the purpose of understanding lubrication conditions of an oil film between a piston and a cylinder, a technology has been proposed to visualize flow inside an oil film by using a substance where a photochromic reaction takes place (non-patent literature 1).

A photochromic reaction is a phenomenon in which the absorption spectrum of a substance changes with the change in the molecular structure of a photochromic component of the substance, caused by the substance being irradiated with light such as ultraviolet light. In other words, prior to a change in the molecular structure of the photochromic component that acts as a dye, the substance does not have an absorption spectrum and therefore does not display color when irradiated with light. On the other hand, the substance will absorb light and display color when irradiated with light of a certain wavelength range if the molecular structure of the dye has changed.

With the technology described in the non-patent literature 1, a photochromic compound that acts as a dye is contained in a lubricating oil (engine oil), and light (e.g., ultraviolet light) for changing the molecular structure of the photochromic compound is used to irradiate the engine oil. Images of the part where the molecular structure of the photochromic compound, the dye, has changed are taken over time. Images of the lubricating oil is taken with a camera while the lubricating oil is irradiated with illumination light used for observation (such as white light).

By illuminating the part of the engine oil being measured with illumination light used for observation, reflected light from the engine oil (to be precise, light that passes the engine oil and is reflected from the engine behind the engine oil) is obtained. Due to the effect of the change in absorption spectrum caused by photochromism, light intensity of the reflected light in the absorbed wavelength region is reduced. By taking images of the light intensity of reflected light over time and analyzing the images, the flow of engine oil can be observed.

Absorbance is used as an index of the amount of absorption of light, and the images are analyzed using absorbance. Absorbance may be obtained by the following equation.

When light intensity (an intensity value of an image) before and after coloring are denoted by $I_{before}$ and $I_{after}$ respectively, the equation for absorbance $A_1$ is as follows.

$$A_s = -LOG(I_{after}/I_{before})$$

Note that "LOG" indicates a common logarithm.

CITATION LIST

Non-Patent Literature

Non-patent literature 1: "Study on Flow Visualization of Oil Film", Akihiko Azetsu, Ikkei Kitajima, Proceedings of the 2015 Annual Meeting of JSME, The Japan Society of Mechanical Engineers

SUMMARY OF THE INVENTION

Technical Problem

Although, according to the technology described in non-patent literature 1, it is possible to gain an understanding of the lubrication conditions of an oil film, noises arising from changes to the oil film caused by the movement of a drive part, movement of an ad film surface, air bubble distribution, and so on obstruct the detailed understanding of oil film flow. There is thus a demand for a more detailed observation of lubrication conditions of oil films.

However, the non-patent literature 1 does not describe nor suggest specific technical details that fulfill such a demand.

The present invention has been made in view of the above circumstances, and it is an object of the present invention to provide a measurement method, measurement device, and measurement system that are capable of taking measurements of a measured object even in a measurement environment such as where the measured object is present in a moving body or in a changing environment.

Hereinafter, a transformed photochromic compound refers to a photochromic compound whose amount of absorption in a specific wavelength range has changed through exposure to transformation-inducing light that causes photochromism. Also, measurement of a measured object includes, for example, visualization of flow over time and thickness measurement at a specific point in time.

Solution to Problem

In order to solve the problems described above, an embodiment of the present invention provides a measurement method for visualizing fluid flow, the measurement method including: a preparation process of dissolving in a fluid a photochromic compound, whose amount of absorption of light changes upon irradiation with transformation-inducing light; a transformation-inducing irradiation process of irradiating the fluid with transformation-inducing light that causes photochromism; and a post-transformation imaging process of taking an image of the fluid after irradiation with the transformation-inducing light.

During the post-transformation imaging process, a first image is generated by taking an image of the fluid by using first light in the first wavelength range in which an amount of absorption of light changes upon irradiation with transformation-inducing light.

Because a measurement method that includes these processes takes an image of a fluid by using a first wavelength range where the amount of absorbance of light changes, the transformed photochromic compound within the fluid appears in a colored state in the first image. By observing the first image therefore, a fluid can be measured more accurately than before. For example, by observing the first image, it is possible to see directly where a colored part is within a fluid and what the colored part is like in comparison to the surrounding fluid, making it possible for fluid flow to be clearly visualized. Also, by observing the color density of the colored part, it is possible to measure the thickness of the colored part at a specific point in time.

Furthermore, in the measurement method, the post-transformation imaging process may further generate a second image of the fluid that is taken at the same time as the first image is taken, with the second image taken using second light in a second wavelength range in which the amount of absorption does not change or hardly changes. An image processing process may then be carried out after the post-transformation imaging process, with the image processing process generating a third image by using the first image and the second image.

For example, the third image is generated by calculating the logarithm of the ratio of a first image and a second image. More specifically, the image processing process may generate the third image by calculating the absorbance A1 at each pixel using equation (1) shown below and creating a two-dimensional pattern out of calculated results for the pixels.

$$A1 = -\text{LOG}(I1_1/I2_1) \qquad (1)$$

In the above equation, $I1_1$ denotes a light intensity of a pixel that is included in a first image taken in the post-transformation imaging process, and $I2_1$ denotes a light intensity of a pixel that is included in a second image taken in the post-transformation imaging process. Note that "LOG" indicates a common logarithm.

Alternatively, in the measurement method, the post-transformation imaging process may further generate a second image of the fluid that is taken at the same time as the first image is taken, with the second image taken using second light in a second wavelength range in which the amount of absorption does not change or hardly changes. A fluid-thickness calculation process may then be carried out after the post-transformation imaging process in order to calculate a thickness of the fluid by using the first image and the second image.

For example, a fluid thickness is calculated from the relationship between absorbance and thickness (such as a ratio). More specifically, the fluid-thickness calculation process may calculate an absorbance A1 at a pixel of an area irradiated with transformation-inducing light by using equation (1) given below, and then calculate a fluid thickness L by using equation (3) given below.

$$A1 = -\text{LOG}(I1_1/I2_1) \qquad (1)$$

$$L = A1/\mu \qquad (3)$$

In the above equations, $I1_1$ denotes a light intensity of a pixel that is included in a first image taken in the post-transformation imaging process, $I2_1$ denotes a light intensity of a pixel that is included in a second image taken in the post-transformation imaging process, and $\mu$ denotes an absorption coefficient of the fluid after the photochromic compound is dissolved.

Furthermore, an embodiment of the present invention provides a measurement device for visualizing a flow of a fluid in which a photochromic compound, whose amount of absorption of light in a specific wavelength range changes upon irradiation with transformation-inducing light that causes photochromism, is dissolved.

This measurement device includes first image storage that is configured to store a first image taken of the fluid by using first light in a first wavelength range in which the amount of absorption changes, second image storage that is configured to store a second image of the fluid that is taken at the same time as the first image is taken, the taking of the second image using second light in a second wavelength range in which the amount of absorption does not change or hardly changes, and an image processor that is configured to generate a third image on which the flow of the fluid is visualized by using the first image and the second image.

The image processor generates a third image by using the first image and the second image that are taken after the fluid is irradiated with the transformation-inducing light.

For example, a third image is generated by calculating the logarithm of the ratio of a first image and a second image. More specifically, the image processor may generate the third image by calculating an absorbance A1 at each pixel using equation (1) given below and creating a two-dimensional pattern out of calculated results for the pixels.

$$A1 = -\text{LOG}(I1_1/I2_1) \qquad (1)$$

In the above equation, $I1_1$ denotes a light intensity of a pixel that is included in a first image taken after irradiation by the transformation-inducing light, and $I2_1$ denotes a light intensity of a pixel that is included in a second image taken after irradiation by the transformation-inducing light. Note that "LOG" indicates a common logarithm.

Furthermore, an embodiment of the present invention provides a measurement device for measuring a thickness of a fluid in which a photochromic compound, whose amount of absorption of light in a specific wavelength range changes upon irradiation with transformation-inducing light that causes photochromism, is dissolved.

This measurement device includes first image storage that is configured to store a first image taken of the fluid using first light in a first wavelength range in which the amount of absorption changes, second image storage that is configured to store a second image of the fluid that is taken at the same time as the first image is taken, the taking of the second image using second light in a second wavelength range in which the amount of absorption does not change or hardly changes, and a fluid thickness calculator that is configured to calculate a thickness of the fluid by using the first image and the second image.

The fluid thickness calculator calculates a thickness of the fluid by using the first image and the second image that are taken after the fluid is irradiated with the transformation-inducing light.

For example, a fluid thickness is calculated from the relationship between absorbance and thickness (such as a ratio). More specifically, the fluid thickness calculator may calculate an absorbance A1 at a pixel of an area irradiated by transformation-inducing light by using equation (1) given below, and then calculate a fluid thickness L by using equation (3) given below.

$$A1 = -\text{LOG}(I1_1/I2_1) \qquad (1)$$

$$L = A1/\mu \qquad (3)$$

In the above equations, $I1_1$ denotes a light intensity of a pixel that is included in a first image taken after irradiation by the transformation-inducing light, $I2_1$ denotes a light intensity of a pixel that is included in a second image taken after irradiation by the transformation-inducing light, and $\mu$ denotes an absorption coefficient of the fluid after the photochromic compound is dissolved.

A measurement method composed of these processes includes a process where a first image of the fluid is taken using the first wavelength range in which the amount of absorption of light changes and where a second image of the fluid is taken using the second wavelength range in which absorbance hardly changes or does not change at all. Also, a measurement device with such a configuration stores the first image, an image of the fluid taken using the first wavelength range in which the amount of absorbance of light changes, and the second image, an image of the fluid taken using the second wavelength range in which the amount of absorbance of light hardly changes or does not change at all.

Since the first wavelength range is a range in which the amount of absorption of light of the transformed photochromic compound changes, the transformed photochromic compound in the fluid appears in a colored state in the first image. If a change in the state of the fluid (for example, the oil film thickness) occurs, the distribution of the transformed photochromic compound will appear in the first image, together with discoloration due to dirt, scratches, and the like on the device and the effects of change in the fluid's state, such as fluid surface movement and air bubble distribution, that are reflected in the first image as noise.

Since the second wavelength range is a range in which the amount of absorption of light of the transformed photochromic compound does not change or hardly changes, the transformed photochromic compound in the fluid is not colored in the second image. Discoloration due to dirt, scratches, and the like on the device, as well as the fluid's state such as fluid surface movement and air bubble distribution will appear in the second image.

Since the first image and the second image taken at the same instance of time show the fluid in the same state, with the same fluid surface movement, air bubble distribution, and so on, the third image that is formed using the first image and the second image has various noises reduced, where noises include the effects of change in the fluid's state such as fluid surface movement and air bubble distribution. As a result, the change in the distribution of the colored, transformed photochromic compound is shown more clearly in the third image. Similarly, the value of fluid thickness L that is calculated using the first image and the second image becomes more accurate due to the reduced effects of the various noises.

Furthermore, the measurement method may further include a pre-transformation imaging process in which a first image and a second image of the fluid prior to irradiation by the transformation-inducing light are taken, with the pre-transformation imaging process coining before the transformation-inducing irradiation process. The third image may be generated during the image processing process by calculating an absorbance A at each pixel using equation (2) given below and creating a two-dimensional pattern out of calculated results for the pixels.

$$A = -\text{LOG}(I1_1/I2_1) - [-\text{LOG}(I1_0/I2_0)] \quad (2)$$

In the above equation, $I1_0$ denotes a light intensity of a pixel that is included in a first image taken in the pre-transformation imaging process, and $I2_0$ denotes a light intensity of a pixel that is included in a second image taken in the pre-transformation imaging process. Note that "LOG" indicates a common logarithm.

Alternatively, the measurement method may further include a pre-transformation imaging process in which a first image and a second image of the fluid prior to irradiation by the transformation-inducing light are taken, with the pre-transformation imaging process coming before the transformation-inducing irradiation process. The fluid-thickness calculation process may calculate an absorbance A at a pixel of an area irradiated by transformation-inducing light using equation (2) given below, and then calculate a fluid thickness L by using equation (4) given below.

$$A = -\text{LOG}(I1_1/I2_1) - [-\text{LOG}(I1_0/I2_0)] \quad (2)$$

$$L = A/\mu \quad (4)$$

In the above equation, $I1_0$ denotes a light intensity of a pixel that is included in a first image taken in the pre-transformation imaging process, and $I2_0$ denotes a light intensity of a pixel that is included in a second image taken in the pre-transformation imaging process.

Yet further, in a measurement device, the image processor may generate the third image by calculating an absorbance A at each pixel using equation (2) given below and creating a two-dimensional pattern out of calculated results for the pixels.

$$A = -\text{LOG}(I1_1/I2_1) - [-\text{LOG}(I1_0/I2_0)] \quad (2)$$

In the above equation, $I1_0$ denotes a light intensity of a pixel that is included in a first image taken before irradiation by the transformation-inducing light, and $I2_0$ denotes a light intensity of a pixel that is included in a second image taken before irradiation by the transformation-inducing light. Note that "LOG" indicates a common logarithm.

Yet further, in a measurement device, the fluid-thickness calculator may calculate an absorbance A at a pixel of an area irradiated by transformation-inducing light using equation (2) given below and then calculate a fluid thickness L using equation (4) given below.

$$A = -\text{LOG}(I1_1/I2_1) - [-\text{LOG}(I1_0/I2_0)] \quad (2)$$

$$L = A/\mu \quad (4)$$

In the above equations, $I1_0$ denotes a light intensity of a pixel that is included in a first image taken before irradiation with the transformation-inducing light, and $I2_n$ denotes a light intensity of a pixel that is included in a second image taken before irradiation with the transformation-inducing light.

A measurement method that is composed of these processes and a measurement device configured in this way generates a third image or calculates a fluid thickness L by using the first image and second image of the fluid taken before irradiation with the transformation-inducing light and the first image and second image of the fluid taken after irradiation with the transformation-inducing light.

There may be cases where there is a part (for example, an edge) where reflectivity differs for light in the first wavelength range and light in the second wavelength range, or cases where the distribution of light intensity differs for light in the first wavelength range and light in the second wavelength range due to, say, the use of two light sources (causing, for example, the upper part of the first image to become bright and the lower part of the second image to become bright). Even in these cases, the first image taken before irradiation with transformation-inducing light and the first image taken after irradiation with transformation-inducing light, and the second image taken before irradiation with transformation-inducing light and the second image taken after irradiation with transformation-inducing light show the state of the fluid with light in the first wavelength range that has substantially the same condition and with light in the second wavelength range that has substantially the same condition.

For this reason, in the third image, not only is the effect of discoloration from dirt, scratches, and the like on a device reduced, but various noises caused by light, such as those arising from having pans where reflectivity differs due to the difference in wavelengths of light in the first wavelength range and light in the second wavelength range and from differing distributions of light intensity with light in the first wavelength range and light in the second wavelength range, are simultaneously reduced. As a result, change in distribution of the colored, transformed photochromic compound appears more clearly. This makes it possible to visualize fluid flow more clearly, even in a measurement environment where the fluid is in a changeable state such as when the fluid is in a moving object or in a changing environment. Similarly, the value of fluid thickness L becomes more accurate due to reduction in the effect of noise.

Furthermore, an embodiment of the present invention provides a measurement system that includes a measurement device, a lighting that is configured to irradiate the fluid with illumination light which includes the first light and the second light, and a separator unit that is configured to separate the illumination light into the first light in the first wavelength range and the second light in the second wavelength range after the illumination light has been transmitted through the fluid.

This measurement system further includes a first imaging unit that is configured to capture the first light separated by the separator unit and generates the first image, and a second imaging unit that is configured to capture the second light separated by the separator unit and generates the second image.

The lighting emits the illumination light as a light pulse, with the timing of emission of the illumination light matching the timing of the first imaging unit and the second imaging unit taking images.

A measurement system configured in this way emits illumination light when images are taken, meaning that illumination light does not have to be emitted when images are not being taken. Due to this, the period during which the transformed state of a photochromic compound is reduced from exposure to light and heat of illumination light can be shortened, and sufficient amount of illumination light can be emitted when taking images, making it possible to clearly visualize fluid flow over a long period of time.

Furthermore, a measurement system may include a transformation-inducing light source that emits the transformation-inducing light. The transformation-inducing light source includes a function for adjusting the size of light to an arbitrary size to determine an area of visualization of the flow of the fluid and a function for irradiating an arbitrary location of the fluid with the transformation-inducing light, and emits the transformation-inducing light of the arbitrary size as a light pulse so that the fluid is irradiated at the arbitrary location where the flow of the fluid is to be visualized.

A measurement system configured in this way can adjust the position and size of the area to be visualized for fluid flow visualization. Also, because the transformation-inducing light source emits light as a light pulse, the blurring of an image of the colored portion, which marks the area to be visualized within the fluid that flows, can be minimized.

Furthermore, a measurement system may further include a controller that, when there is a drive part that reciprocates or rotates in the fluid, receives position information of the drive part and controls the timing with which the lighting or the transformation-inducing light source irradiates the fluid.

The controller emits the transformation-inducing light as a light pulse when the drive part is at a particular position and takes an image when the drive part is at a particular position for imaging.

In a measurement system configured in this way, the transformation-inducing light source emits light that induces photochromism as a light pulse. The location of irradiation can be restricted to a particular location of a fluid, even when there is a drive part in the fluid. Also, because images are taken in synchronization with the motion of the drive part, the first image and the second image taken before irradiation with transformation-inducing light and the first image and the second image taken after irradiation with transformation-inducing light show the drive part at a same position. Comparison can therefore be made between images taken before and images taken after irradiation with the transformation-inducing light, making it possible to visualize fluid flow that accompany the movement of a drive part.

Furthermore, in a measurement system, the lighting may selectively generate the first light and the second light as separate light.

In a measurement system configured in this way, distinctly separate first illumination light and second illumination light are emitted simultaneously as illumination light. The illumination light therefore does not include any extra wavelengths. Excess light intensity and heat from the illumination light source can hence be reduced, and attenuation of the transformed photochromic compound can be suppressed, making it possible to generate the first image and the second image with high accuracy.

Alternatively, a measurement system includes a measurement device, a lighting that is configured to irradiate the fluid with illumination light which includes the first light and the second light, and a separator unit that is configured to separate the illumination light into the first light in the first wavelength range and the second light in the second wavelength range after the illumination light has been transmitted through the fluid.

This measurement system further includes a first imaging unit that is configured to capture the first light separated by the separator unit and generates the first image, a second imaging unit that is configured to capture the second light separated by the separator unit and generates the second image, and a transformation-inducing light source that emits the transformation-inducing light.

The transformation-inducing light source completely transforms a photochromic compound in the direction of thickness of the fluid.

A measurement system configured in this way can accurately measure fluid thickness Advantageous Effects of the Invention According to the present invention, an object can be measured even in a measurement environment where the measured object is in a moving body or in a changing environment.

BRIEF DESCRIPTION OF THE DRAWINGS

FIG. 13's (a) shows a third image immediately after (i.e., 0 seconds) a photochromic compound is irradiated with light that induces photochromism; FIG. 13's (b) shows a third image 10 seconds after the irradiation; FIG. 13's (c) shows a third image 20 seconds after the irradiation; FIG. 13's (d) shows a third image 30 seconds after the irradiation.

DESCRIPTION OF EMBODIMENTS

Descriptions of embodiments of the present invention will be given in detail with reference to drawings.

Each figure is a schematic representation to enable sufficient understanding of the present invention. The present invention is therefore not limited to the examples shown in the figures. Furthermore, in the referenced drawings, the illustrated dimensions of members that make up the present invention may be exaggerated to make an explanation clear. Note that common or similar components used in the figures are denoted by the same reference signs, and repeat descriptions of such components are avoided.

In a first embodiment, a description will be given for a case where the flow of a fluid being measured over time is visualized. In a second embodiment, a description will be given for a case where the thickness of a fluid being measured is obtained at a given point in time. Note that the visualization of fluid flow and the measurement of fluid thickness are examples of the measurement of a fluid.

First Embodiment

Configuration of Fluid Flow Visualization System

A fluid flow visualization system (hereinafter a "visualization system") is a system for visualizing the flow of a fluid to be measured. The visualization system visualizes, for example, the lubrication conditions of a lubricant used with a moving body such as a piston, cylinder, sliding bearing, and other sliding surfaces. Note that the visualization system is one example of a fluid measurement system.

Figure 1:
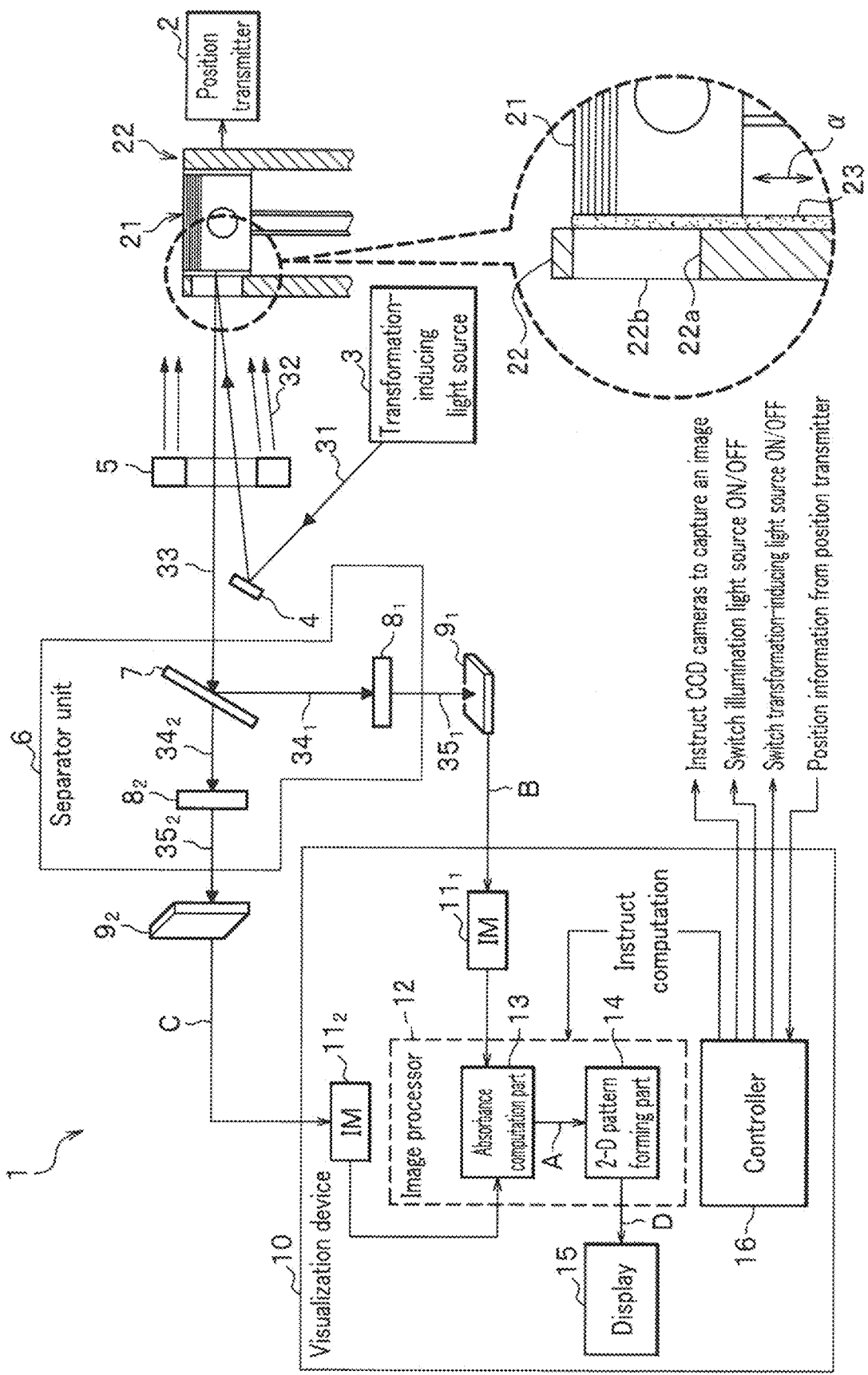
FIG. 1 is a schematic block diagram of a fluid flow visualization system according to a first embodiment of the present invention.

The present embodiment will be described for a case where the flow of a fluid 23 that is interposed between a piston 21 and cylinder 22 is visualized as shown in FIG. 1.

The piston 21 is a drive part that reciprocates inside the cylinder 22 in an u direction. The fluid 23 flows over time, and the state of the fluid 23 (such as thickness) changes, especially when the piston 21 is driven inside the cylinder 22. An opening 22a is formed on the cylinder 22 and installed with a fitting member 22b made from a transparent material such as glass. This way, the fluid 23 can be observed from outside the cylinder 22 through the opening 22a. The area of the fluid 23 that can be observed through the opening 22a is referred to as the observation part hereinafter.

A photochromic compound (not shown in the figure) is dissolved in the fluid 23. The photochromic compound is, say, 1,3,3-Trimethylindolino-6'-nitrobenzopyrylospiran, a spiropyran-based compound. Through absorbing light in a specific wavelength range, this spiropyran-based compound transforms from having a colorless spiropyran structure to a colored merocyanine structure. The fluid 23 may be of any kind, say oil, as long as a photochromic compound can be dissolved. No restriction applies to the viscosity of the fluid 23, and the fluid 23 may be a highly viscous substance such as a gelatinous substance.

As shown in FIG. 1, a visualization system 1 according to the present embodiment includes a position transmitter 2, a transformation-inducing light source 3, a mirror 4, an illumination light source 5, a separator unit 6, a pair of CCD cameras $9_1$, $9_2$, and a fluid flow visualization device 10 (hereinafter a "visualization device 10"). Note that although the visualization system here is configured with CCD cameras, the cameras may be of any kind as long as images of light can be captured in the first wavelength range and the second wavelength range, such as cameras that use CMOS or a camera tube.

The separator unit 6 includes an image-splitting dichroic mirror (DM) 7, and a pair of bandpass filters (BPFs) $8_1$, $8_2$.

The visualization device 10 includes a pair of image storage $11_1$, $11_2$, an image processor 12, a display 15, and a controller 16. The image processor 12 includes an absorbance computation part 13 and a 2-D pattern forming part 14. Note that the visualization device 10 is one example of a fluid measurement device.

The position transmitter 2 transmits position information of the piston 21, the drive part, to the visualization device 10. Note that when the lubrication conditions of the fluid 23 is measured over time while the piston 21 is stationary, the visualization system 1 does not have to include the position transmitter 2.

The position transmitter 2 acquires, for example, the rotational position of a crank (not shown in figure) that is connected to the piston 21 by using an encoder that is attached to the crank, and sends a signal to the visualization device 10 at a pre-determined rotational position. It is also possible for a position transmitter 2 to output a signal based on the control signal to an engine, to output a signal by detecting the position of the piston 21 directly, or to deliver a signal by predicting the position of the piston 21 from elapsed time. When observing the lubrication conditions of a bearing that supports a shaft that rotates at high speed, a signal on the rotational angle of the shaft is output to the visualization device 10.

The transformation-inducing light source 3 is a device for irradiating, via the opening 22*a*, a photochromic compound that is contained in the fluid 23 with transformation-inducing light 31, which causes the photochromic compound to undergo photochromism. The wavelength of the transformation-inducing light 31 may be selected according to the type of photochromic compound used, and, for example, ultraviolet light may be used. The transformation-inducing light source 3 is, for example, a nitrogen laser (with a wavelength of 337 nm) or a YAG laser (with a wavelength of 1064 nm), and when ultraviolet light is to be emitted, a YAG laser in the third or fourth harmonic is used. To observe the lubrication conditions of the fluid 23 when the piston 21 is in reciprocating motion, the transformation-inducing light 31 may be emitted as a pulse. The timing of emission of the pulses may be matched to the reciprocating motion of the piston 21 so that a particular location of the piston 21 is irradiated with the transformation-inducing light 31. As a way of adjusting the region of a fluid to be measured, a laser may be used as a transformation-inducing light source 3, or a lens may be used to focus the transformation-inducing light 31 so as to narrow the irradiated region. The lens may also be used to widen the focus so that the region that is irradiated by the transformation-inducing light 31 is widened. Note that the methods for adjusting the region to be measured are not limited to the above, and other methods may be used as long as the region irradiated by the transformation-inducing light 31 can be adjusted.

The molecular structure of the photochromic compound acting as a dye that is dissolved in the fluid 23 is transformed by the transformation-inducing light 31, resulting in the change in the amount of absorption of light in a specific wavelength range. Hereinafter, the wavelength range in which the amount of absorption of light changes when the photochromic compound is irradiated with transformation-inducing light 31 will be called "the first wavelength range", and the wavelength range in which the amount of absorption of light does not change or hardly changes when the photochromic compound is irradiated with transformation-inducing light 31 will be called "the second wavelength range". The first wavelength range is, for example, a wavelength range corresponding to green light. The second wavelength range is, for example, a wavelength range corresponding to red light.

Note that the transformation of the molecular structure of the dye by photochromism is reversible. The molecular structure will transform back to the original structure through absorbing heat or light. For this reason, when taking an image of the fluid 23 after molecular structure transformation, it is best to keep the amount of heat or light given to the photochromic compound to a minimum. Details of imaging of the fluid 23 is given later.

The mirror 4 is a device for reflecting transformation-inducing light 31. This mirror 4 is arranged so that the transformation-inducing light 31 is directed towards a specific irradiation location.

The illumination light source 5 is a device for irradiating the fluid 23 via the opening 22*a* with illumination light 32 that is necessary for taking an image. The illumination light 32 includes light in the first wavelength range and light in the second wavelength range. Hereinafter, illumination light 32 in the first wavelength range is called the "first illumination light", and illumination light 32 in the second wavelength range is called the "second illumination light". The illumination light source 5 is, for example, a white light emitting diode (LED).

The illumination light source 5 emits illumination light 32 as a light pulse so that the timing of emission coincides with the taking of an image of the fluid 23. In order to minimize the reverse transformation of the molecular structure of the transformed photochromic compound, it is best to keep the duration of emission of the illumination light 32 as short as possible (for example, a few milliseconds) within the allowable range of time needed to capture an image of the fluid 23. In terms of camera operation principle, the emission duration is best made shorter than the time during which the shutters of CCD cameras $9_1$, $9_2$ are open when the charge-coupled devices (CCDs; image sensors) are exposed (hereinafter the "shutter period"). Exposure of the transformed photochromic compound to the illumination light 32 beyond the shutter period leads to the reduction of transformation of the transformed photochromic compound and is therefore undesirable.

Note that the shape of the illumination light source 5 is not restricted by the present invention. The illumination light source 5 may, for example, be cylindrical or rectangular in shape. Also, the illumination light source 5 may be configured from separate devices that selectively emit the first illumination light and the second illumination light.

The separator unit 6 is a device for separating reflected light 33 into the first wavelength range and the second wavelength range, where the reflected light 33 is illumination light 32 that is reflected from the fluid 23 (more precisely, light that passes through the fluid 23 and is reflected from the piston 21). Although an example is shown here where the separator unit 6 includes an image splitting dichroic mirror 7 and bandpass filters $8_1$, $8_2$, a different method of separation may be employed as long as the reflected light 33 can be separated into the first wavelength range and the second wavelength range. Although the separator unit 6 here is shown as a single device that includes an image splitting dichroic mirror (DM) 7 and bandpass filters (BPFs) $8_1$, $8_2$, the separator unit 6 may be configured from an image splitting dichroic mirror 7 and bandpass filters $8_1$, $8_2$ that are separate devices. Note that the separator unit 6 is required to retain the image shape captured by the reflected light 33 during the separation process.

The image-splitting dichroic mirror 7 has a reflection wavelength band and a transmission wavelength band. Of the reflected light 33, the image-splitting dichroic mirror 7 reflects light $34_1$ in the reflection wavelength band and transmits light $34_2$ in the transmission wavelength band. For example, the first wavelength range fits within the reflection wavelength band and the second wavelength range fits within the transmission wavelength band.

The reflection and transmission properties of the image-splitting dichroic mirror 7 will be explained with reference to FIG. 2. The curved line 41 of FIG. 2 shows the absorbance properties of a transformed photochromic compound, and depicts the relationship between the wavelength of light (nm) and the absorbance of the photochromic compound dissolved in the fluid 23 (a logarithm of the ratio of light intensity before and after coloring).

The amount of absorption of light at around a wavelength of 520 nm changes most when the photochromic compound depicted by the curved line 41 is irradiated with transformation-inducing light 31. The change in the amount of absorption of light of a given wavelength becomes smaller the shorter or longer the wavelength becomes compared to the wavelength of around 520 nm. The amount of absorption of light of a given wavelength changes little for wavelengths exceeding around 700 nm.

Figure 2:
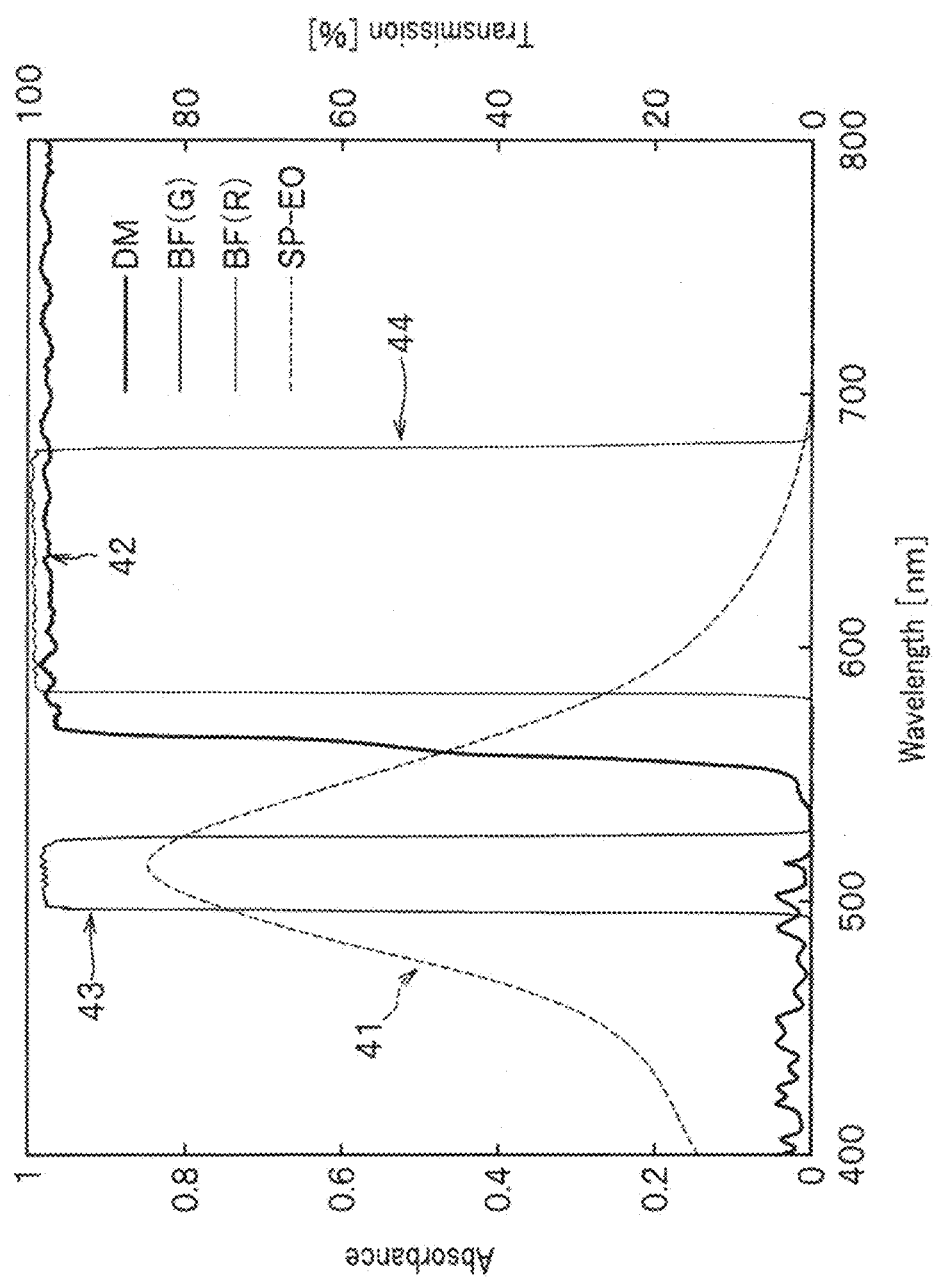
FIG. 2 is a diagram explaining the properties of a separator unit provided in the fluid flow visualization system according to the first embodiment of the present invention.

The curved line 42 of FIG. 2 shows the reflection and transmission properties of the image-splitting dichroic mirror 7, and depicts the relationship between the wavelength of light (nm) and transmission (%) (Semrock, Inc., product code: FF560-FDi01-25x36). The image-splitting dichroic mirror 7 depicted in FIG. 2 reflects light with a wavelength of less than 570 nm and transmits light with a wavelength of 570 nm or more. Thus, the first wavelength range is included in the reflection wavelength band (wavelengths of less than 570 tan), and the second wavelength range is included in the transmission wavelength band (wavelengths of 570 nm or more). Therefore, the image-splitting dichroic mirror 7 separates light $34_1$ that includes the first wavelength range and light $34_1$ that includes the second wavelength range by reflecting light $34_1$ and transmitting light $34_2$.

The bandpass filters $8_1$, $8_2$ are devices that each pass light in a specific wavelength range. The transmission properties of the bandpass filters $8_1$, $8_2$ will be explained with reference to FIG. 2. The curved line 43 of FIG. 2 shows the transmission property of the bandpass filter $8_1$ and depicts the relationship between the wavelength of light (nm) and transmission (%) (Sermrock, Inc., product code: FF01-512/25-25). The bandpass filter $8_1$ depicted in FIG. 2 passes light with wavelengths in the range of around 490-540 nm and blocks light with wavelengths outside that range. The first wavelength range is included in the range of wavelengths that the bandpass filter $8_1$ passes. Hereinafter, light that has passed the bandpass filter $8_1$ is referred to as the "first reflected light $35_1$".

The curved line 44 of FIG. 2 shows the transmission property of the bandpass filter $8_2$, and depicts the relationship between the wavelength of light (nm) and transmission (%) (Semrock, Inc., product code: FF01-630/92-25). The bandpass filter $8_2$ depicted in FIG. 2 allows light with wavelengths in the range of around 580-680 nm to pass through and blocks light with wavelengths outside that range. The second wavelength range is included in the range of wavelengths that the bandpass filter $8_2$ passes. Hereinafter, light that has passed through the bandpass filter $8_2$ is referred to as the "second reflected light $35_2$".

The CCD cameras $9_1$, $9_2$ are devices for generating images of a fluid 23.

The CCD camera $9_1$ generates a first image B of the fluid 23 with the first reflected light $35_1$ (for example, light with wavelengths of around 490-540 nm) that has passed through the bandpass filter $8_1$. The first image B here includes both an image taken before irradiation with the transformation-inducing light 31 and an image taken after irradiation with the transformation-inducing light 31. Hereinafter, the first image taken before irradiation with the transformation-inducing light 31 may be referred to as the "first image $B_{10}$", and the first image taken after irradiation with the transformation-inducing light 31 may be referred to as the "first image $B_{11}$".

The CCD camera 92 generates a second image C of the fluid 23 with the second reflected light $35_2$ (for example, light with wavelengths of around 580-680 nm) that has passed through the bandpass filter $8_2$. The second image C here includes both an image taken before irradiation with the transformation-inducing light 31 and an image taken after irradiation with the transformation-inducing light 31. Hereinafter, the second image taken before irradiation with the transformation-inducing light 31 may be referred to as the "second image $C_{10}$", and the second image taken after irradiation with the transformation-inducing light 31 may be referred to as the "second image $C_{11}$".

The visualization device 10 is a device that visualizes the flow of the fluid 23 from a first image B and a second image C generated by the CCD cameras $9_1$, $9_2$.

The image storage (IM) $11_1$ and the image storage (IM) $11_2$ are devices that store images generated by the CCD cameras $9_1$, $9_2$. The first image B that is generated by the CCD camera $9_1$ is stored in the image storage $11_1$, and the second image C that is generated by the CCD camera $9_2$ is stored in the image storage $11_2$. The image storage $11_1$ and the image storage $11_2$ are examples of the "first image storage" and the "second image storage". Note that the image storage $11_1$, $11_2$ may be a single device, in which case the first image B and the second image C are stored in image storage 11.

Because the first reflected light $35_1$ that has passed through the bandpass filter $8_1$ is in the first wavelength range, the first images B taken over time show the distribution of the transformed photochromic compound in the fluid 23 at each point in time. When there is a change in the state of the fluid 23 (for examples, oil film thickness), the effects of the change in the state of the fluid is reflected in the distributions of the transformed photochromic compound shown in the first images B. On the other hand, because the second reflected light $35_2$ that has passed through the bandpass filter $8_2$ is in the second wavelength range, the second images C taken over time show the state of the fluid 23 at each point in time.

The image processor 12 acquires a first image B and a second image C from the image storage $11_1$, $11_2$, carries out image processing using the acquired first image B and the second image C, and generates a new, third image D. The image processor 12 includes an absorbance computation part 13 and a 2-D pattern forming part 14. The image processor 12 is realized, for example, through program execution in a CPU (central processing unit), or with a dedicated circuit.

To calculate absorbance, the absorbance computation part 13 uses a first image $B_{10}$ and a second image $C_{10}$, taken of the fluid 23 before irradiation with the transformation-inducing light 31, and a first image $B_{11}$ and a second image $C_{11}$, taken of the fluid 23 after irradiation with the transformation-inducing light 31. Absorbance is obtained by calculating the logarithms of the ratios of these images then calculating the difference between the two values.

For example, let the light intensity of a pixel that is included in a first image $B_{10}$ taken before irradiation by the transformation-inducing light 31 be defined as $11_0$, and the light intensity of a pixel that is included in a second image $C_{10}$ taken before irradiation by the transformation-inducing light 31 be defined as $12_0$. Similarly, let the light intensity of a pixel that is included in a first image $B_{11}$ taken after irradiation by the transformation-inducing light 31 be defined as $11_1$ and the light intensity of a pixel that is included in a second image $C_{13}$ taken after irradiation by the transformation-inducing light 31 be defined as $12_1$.

In this case, the absorbance computation part 13 calculates the absorbance A at each pixel using equation (2) shown below. Note that "LOG" indicates a common logarithm.

$$A = -\text{LOG}(I1_1/I2_1) - [-\text{LOG}(I1_0/I2_0)] \quad (2)$$

$$A = -\text{LOG}\,[(I1_1/I2_1)/(I1_0/I2_0)] \quad (2)$$

The two dimensional (2-D) pattern forming part 14 generates a third image D based on the absorbance A that is calculated by the absorbance computation part 13. The 2-D pattern forming part 14 generates the third image D, for example, by creating a two-dimensional pattern out of the absorbance calculated tin the individual pixels using equation (2) given above.

Because of this, the third image D shows the distribution of the transformed photochromic compound with reduced effects of the change to the fluid's state. In this way, it is possible for the visualization device 10 to clearly visualize fluid flow.

The display 15 is, for example, a display device, and displays the third image D generated by the 2-D pattern forming part 14.

The controller 16 controls the devices that the visualization system 1 includes (a position transmitter 2, a transformation-inducing light source 3, an illumination light source 5, CCD cameras $9_1$, $9_2$, an image processor 12, and so on). Details are given in the "Operation of Fluid Flow Visualization System" section. The controller 16 is, for example, composed of a CPU (central processing unit), ROM (read-only memory), and RAM (random-access memory). Note that a device other than the visualization device 10 may include the controller 16.

Operation of Fluid Flow Visualization System

Next, the operation of the fluid flow visualization system 1 will be described. The visualization system 1 of the present embodiment can visualize the flow of a fluid 23 by taking images of the fluid 23 through the opening 22a when piston 21, a drive part, is either stationary or in motion. By taking images of the fluid 23 over time while piston 21, the drive part, is stationary, lubrication conditions of the fluid 23 over time is observed. On the other hand, by taking images of the fluid 23 over time while piston 21, the drive part, is in motion, lubrication conditions of the fluid 23 due to the reciprocating motion of the piston 21 is observed. Note that the operation of the visualization system 1 is one example of a fluid measurement method.

Operation when the Piston (the Drive Part) is Stationary

Figure 3:
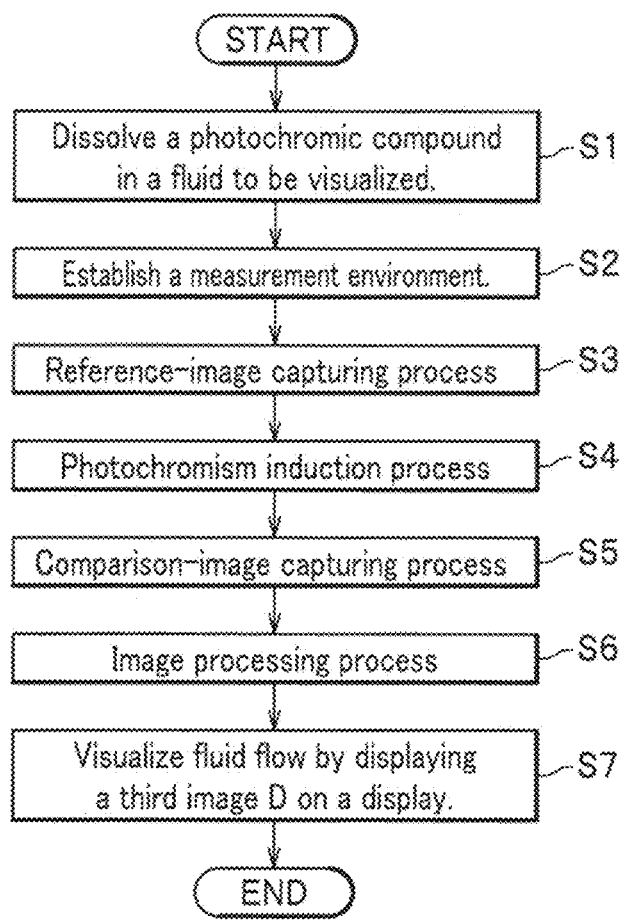
FIG. 3 is a flowchart showing an overall operation of a fluid flow visualization system according to the first embodiment of the present invention.

The operation when piston 21, the drive pan, is stationary will be described with reference to FIGS. 3-7 (also FIG. 1 as needed). FIG. 3 is a flowchart showing the overall operation of the fluid flow visualization system 1, and FIGS. 4-7 are flowcharts explaining the individual processes that are involved.

First, the photochromic compound is dissolved in a fluid 23 to be visualized (step S1), and a measurement environment is established fit the fluid flow visualization system 1 (step S2). This completes that advance preparation. Steps S1 and S2 correspond to the "preparation process" of the claims.

Next, a reference-image capturing process is carried out (step S3). Here, a reference image refers to an image that is taken before a photochromic compound undergoes photochromism, and at least one first image $B_{10}$ and one second image $C_{10}$ are taken. The first image $B_{10}$ and the second image $C_{10}$ that serve as reference images are taken at the same time. Step S3 corresponds to the "pre-transformation imaging step" of the claims.

Next, a photochromism induction process is carried out (step S4). In the photochromism induction process, the fluid 23 is irradiated with transformation-inducing light 31 such as ultraviolet light causing the photochromic compound to undergo transformation. In this process, the region of fluid visualization is determined. Step S4 corresponds to the "transformation-inducing irradiation process" of the claims.

Next, a comparison-image capturing process is carried out (step S5). A comparison image is an image taken after the photochromic compound undergoes photochromism, and at least one first image B and one second image $C_{11}$ are taken. The first image $B_{11}$ and the second image $C_{11}$ that serve as comparison images are taken at the same time. Step S5 corresponds to the "post-transformation imaging process" of the claims.

Next, an image processing process is carried out (step S6). In the image processing process, a third image D is generated by using a first image $B_{10}$ and a second image $C_{10}$ taken in the reference-image capturing process and a first image $B_{11}$ and a second image $C_{11}$ taken in the comparison-image capturing process. The third image D shows the change in distribution of the transformed photochromic compound not only with reduced effects of discoloration due to dirt and scratches on the device but with various noises, including the effects of change in the fluid's state such as fluid surface movement and air bubble distribution, simultaneously reduced. The flow of the fluid 23 is then visualized by displaying the third image D on the display 15 (step S7).

Figure 4:
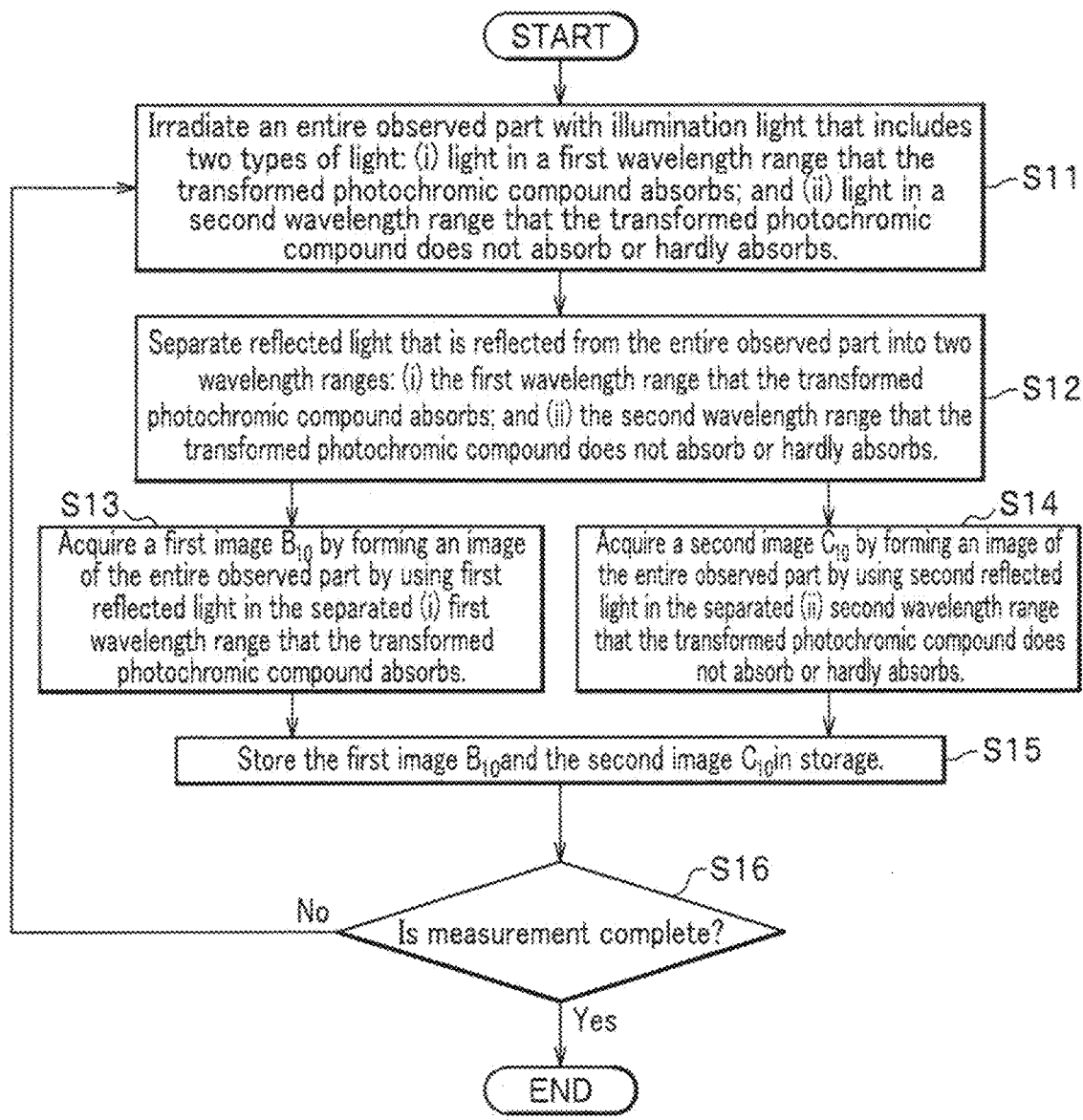
FIG. 4 is a flowchart showing a reference-image capturing process of a fluid flow visualization system according to the first embodiment of the present invention.

The reference-image capturing process (step S3) will be described with reference to FIG. 4.

First, the illumination light source 5 is used to expose the entire observed part with illumination light 32 that includes two types of light in different wavelength ranges (step S11). The two wavelength ranges are (i) a first wavelength range that the transformed photochromic compound absorbs, and (ii) a second wavelength range that the transformed photochromic compound does not absorb or hardly absorbs. In this way, the first illumination light and the second illumination light simultaneously irradiate the observed part.

The separator unit 6 separates reflected light 33 that is reflected from the entire observed part into two wavelength ranges: (i) the first wavelength range that the transformed photochromic compound absorbs and (ii) the second wavelength range that the transformed photochromic compound does not absorb or hardly absorbs (step S12).

A first image $B_{10}$ that serves as a reference image is acquired by forming an image of the entire observed part by using first reflected light $35_1$ in the separated (i) first wavelength range that the transformed photochromic compound absorbs (step S13).

A second image $C_{10}$ that serves as a reference image is acquired by forming an image of the entire observed part by using second reflected light $35_2$ in the separated (ii) second wavelength range that the transformed photochromic compound does not absorb or hardly absorbs (step S14).

Next, the visualization device 10 stores the first image $B_{10}$ and the second image $C_{10}$ in storage composed of image storage $11_1$, $11_2$ (step S15). Whether to finish the measurement is then determined (step S16). The current process is terminated when the measurement is complete. If, on the other hand, the first image $B_{10}$ and the second image $C_{10}$ are to be acquired further, the procedure of steps S11-S15 is repeated. In this way, multiple first images $B_{10}$ and multiple second images $C_{10}$ are acquired. Using the average of the multiple images as a reference image makes it possible to visualize the fluid 23 more clearly.

Figure 5:
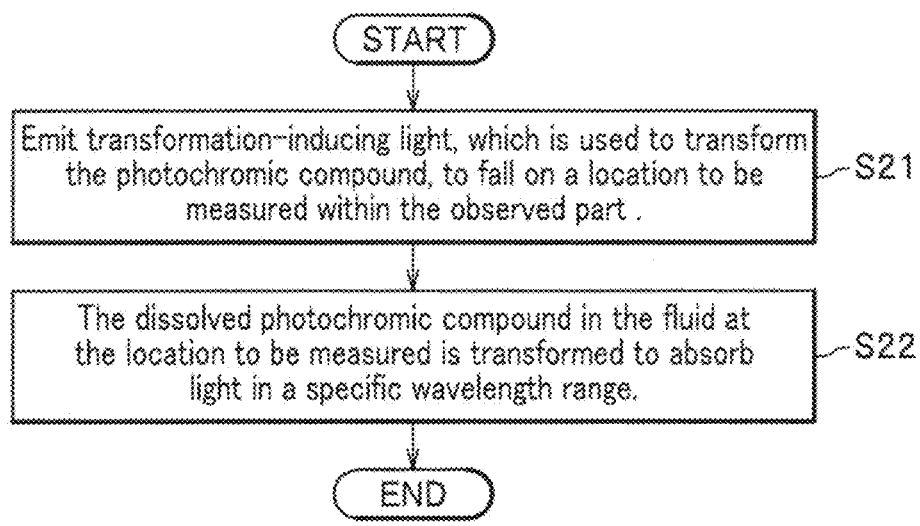
FIG. 5 is a flowchart showing a photochromism induction process of a fluid flow visualization system according to the first embodiment of the present invention.

The photochromism induction process (step S4) will be described with reference to FIG. 5.

In this process, the transformation-inducing light source 3 emits transformation-inducing light 31, which is used to transform the photochromic compound, to fall on a location to be measured within the observed part (step S21).

As a result, the dissolved photochromic compound in the fluid 23 at the location to be measured is transformed to absorb light in a specific wavelength range (step S22).

Figure 6:
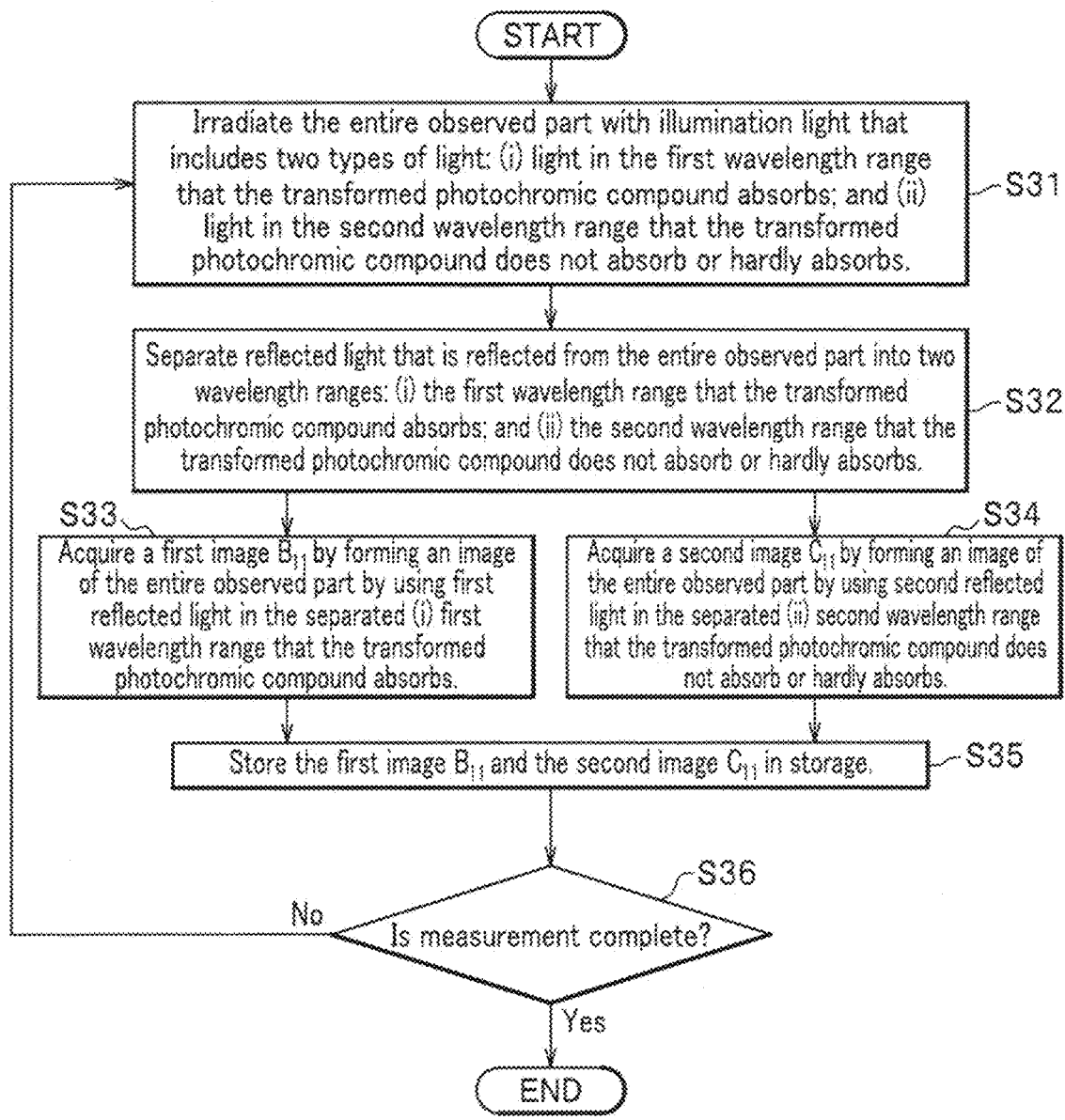
FIG. 6 is a flowchart showing a comparison-image capturing process of a fluid flow visualization system according to the first embodiment of the present invention.

The comparison-image capturing process (step S5) will be described with reference to FIG. 6.

First, the illumination light source 5 is used to irradiate the entire observed part with illumination light 32 that includes two types of light in different wavelength ranges (step S31). The two wavelength ranges are (i) a first wavelength range that the transformed photochromic compound absorbs and (ii) a second wavelength range that the transformed photochromic compound does not absorb or hardly absorbs. In this way, the first illumination light and the second illumination light simultaneously irradiate the observed part.

The separator unit 6 separates reflected light 33 that is reflected from the entire observed part into two wavelength ranges: (i) the first wavelength range that the transformed photochromic compound absorbs and (ii) the second wavelength range that the transformed photochromic compound does not absorb or hardly absorbs (step S32).

A first image $B_{11}$ that serves as a comparison image is acquired by forming an image of the entire observed part by using first reflected light $35_1$ in the separated (i) first wavelength range that the transformed photochromic compound absorbs (step S33).

A second image $C_{11}$ that serves as a comparison image is acquired by forming an image of the entire observed part by using second reflected light $35_2$ in the separated (ii) second wavelength range that the transformed photochromic compound does not absorb or hardly absorbs (step S34).

Next, the visualization device 10 stores the first image $B_{11}$ and the second image $C_{11}$ in storage composed of image storage $11_1$, $11_2$ (step S35). Whether to finish the measurement is then determined (step S36). The current process is terminated when the measurement is complete. If, on the other hand, the first image $B_{11}$ and the second image $C_{11}$ are to be acquired further, the procedure of steps S31-S35 is repeated over time. In this way, time series of first images $B_{11}$ and second images $C_{11}$ are acquired.

Figure 7:
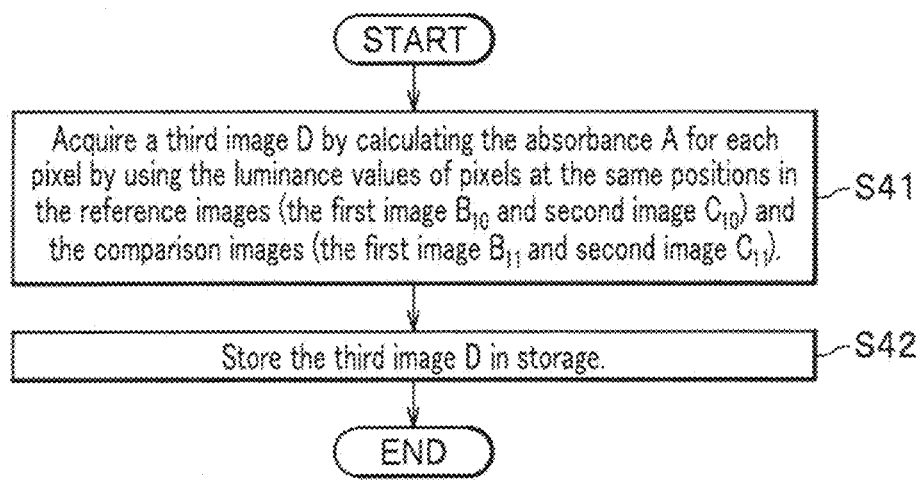
FIG. 7 is a flowchart showing an image processing process of a fluid flow visualization system according to the first embodiment of the present invention.

The image processing process (step S6) will be described with reference to FIG. 7.

In this process, a third image D is obtained by calculating the absorbance A fir each pixel by using the luminance values of the pixels at the same position in the reference images (the first image $B_{10}$ and second image $C_{10}$) and the comparison images (the first image $B_{11}$ and second image $C_{11}$) (step S41). The generated third image D is then stored in the storage (not shown in figure) of the image processor 12 (step S42).

Operation when the Piston (the Drive Part) is in Reciprocating Motion

Figure 8:
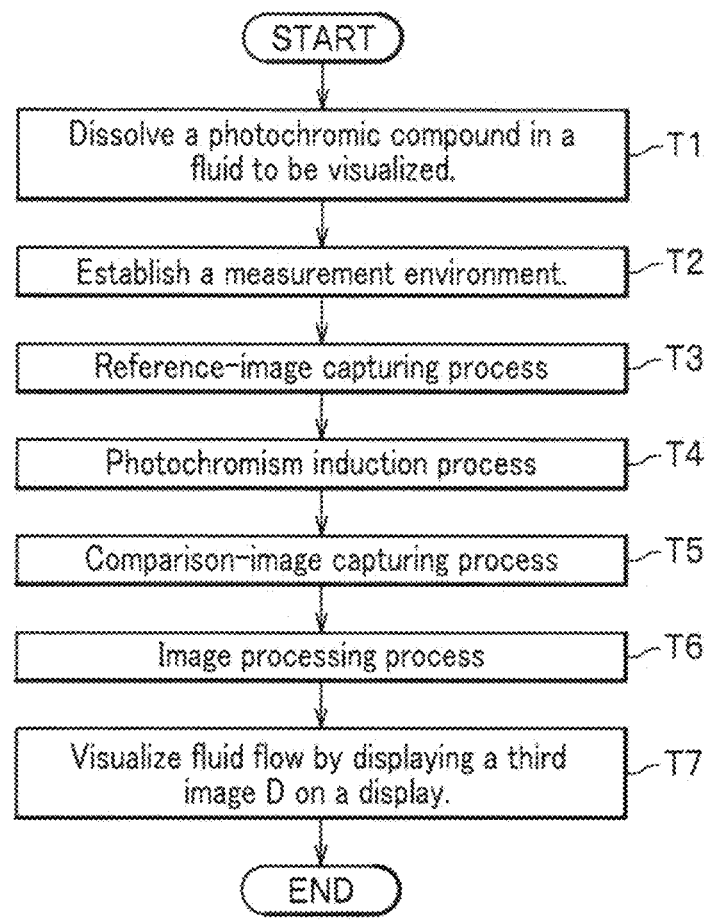
FIG. 8 is a flowchart showing an overall operation of a fluid flow visualization system according to the first embodiment of the present invention.

The operation when piston 21, the drive part, is in reciprocating motion is described with reference to FIGS. 8-12 (also FIG. 1 as needed). FIG. 8 is a flowchart showing the overall operation of the fluid flow visualization system 1, and FIGS. 9-12 are flowcharts explaining the individual processes that are involved.

The overall operation when piston 21, the drive part, is in reciprocating motion includes steps T1-T7. Steps T1, T2, and T7 are the same as steps S1, S2, and S7 (see FIG. 3), which are steps for when piston 21, the drive part, is stationary. Given below are descriptions of processes that differ in their procedures, namely the reference-image capturing process (step T3), the photochromism induction process (step T4), the comparison-image capturing process (step T5), and the image processing process (step T6). Note that steps T1 and T2 correspond to the "preparation process" of the claims, step T3 to the "pre-transformation imaging process", step T4 to the "transformation-inducing irradiation process", and step T5 to the "post-transformation imaging process".

Figure 9:
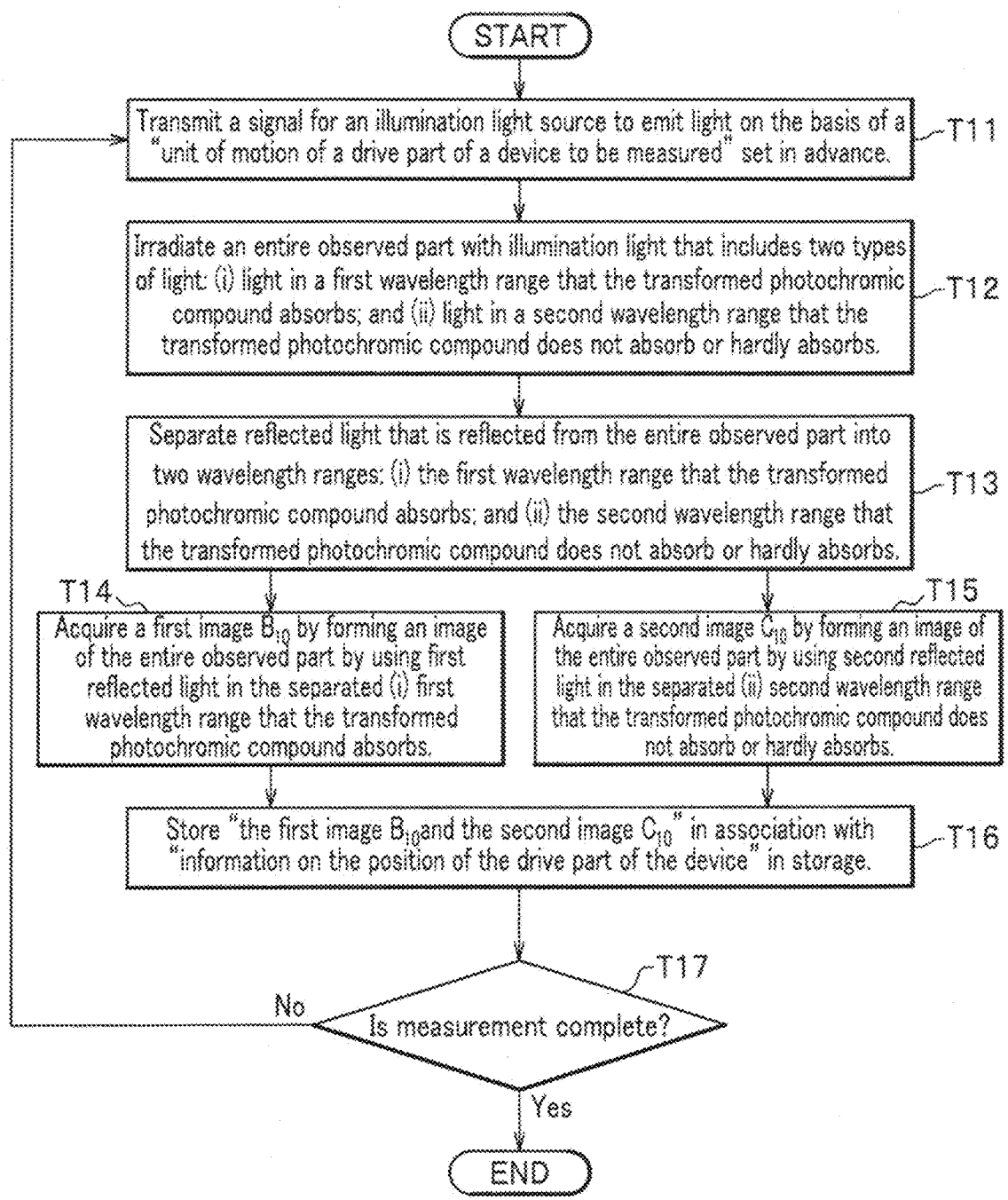
FIG. 9 is a flowchart showing a reference-image capturing process of a fluid flow visualization system according to the first embodiment of the present invention.

The reference-image capturing process (step T3) will be described with reference to FIG. 9.

First, the controller 16 of the visualization device 10 transmits a signal fix the illumination light source 5 to emit light on the basis of a "unit of motion of a drive part (piston 21 in the current embodiment) of a device to be measured" set in advance (step T11). Upon receiving the signal, the illumination light source 5 irradiates the entire observed part by emitting illumination light 32 that includes two types of light in different wavelength ranges (step T12). The two wavelength ranges are (i) a first wavelength range that the transformed photochromic compound absorbs and (ii) a second wavelength range that the transformed photochromic compound does not absorb or hardly absorbs. In this way, piston 21 that is at an image taking position is irradiated simultaneously with the first illumination light and the second illumination light.

Next, the separator unit 6 separates reflected light 33 that is reflected from the entire observed part into two wavelength ranges: (i) the first wavelength range that the transformed photochromic compound absorbs and (ii) the second wavelength range that the transformed photochromic compound does not absorb or hardly absorbs (step T13).

A first image $B_{10}$ that serves as a reference image is acquired by forming an image of the entire observed part by using first reflected light $35_1$ in the separated (i) first wavelength range that the transformed photochromic compound absorbs (step T14).

A second image $C_{10}$ that serves as a reference image is acquired by forming an image of the entire observed part by using second reflected light 335 in the separated (ii) second wavelength range that the transformed photochromic compound does not absorb or hardly absorbs (step T15).

Next, the visualization device 10 stores "the first image $B_{10}$ and the second image $B_{20}$" in association with "information on the position of the drive part of the device" in storage composed of image storage $11_1$, $11_2$ (step T16). Whether to finish the measurement is then determined (step T17). The current process is terminated when the measurement is complete. If, on the other hand, the first image $B_{10}$ and the second image $C_{10}$ are to be acquired further, the procedure of steps T11-T16 is repeated. In this way, the first image $B_{10}$ and second image $C_{10}$ for each position of the drive part are acquired.

Figure 10:
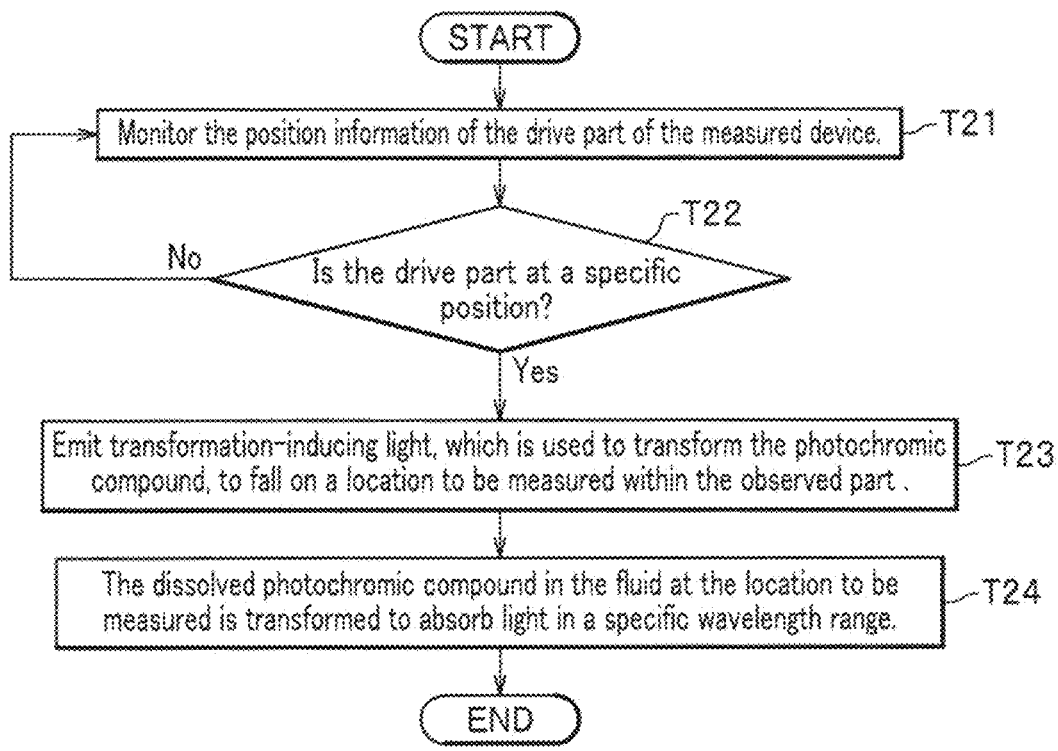
FIG. 10 is a flowchart showing a photochromism induction process of a fluid flow visualization system according to the first embodiment of the present invention.

Next, the photochromism induction process (step T4) will be described with reference to FIG. 10.

First, position information of the drive part (piston 21 in the current embodiment) of a device for which measurement is taken is monitored (step T21), and whether the drive part is at a specific position is determined (step T22). When the drive part is at a specific position, the process proceeds to step T23.

Next, the transformation-inducing light source 3 emits transformation-inducing light 31, which is used to transform the photochromic compound, to fail on a location to be measured within the observed pan (step T23).

As a result, the dissolved photochromic compound in the fluid 23 at the location to be measured is transformed to absorb light in a specific wavelength range (step T24).

Figure 11:
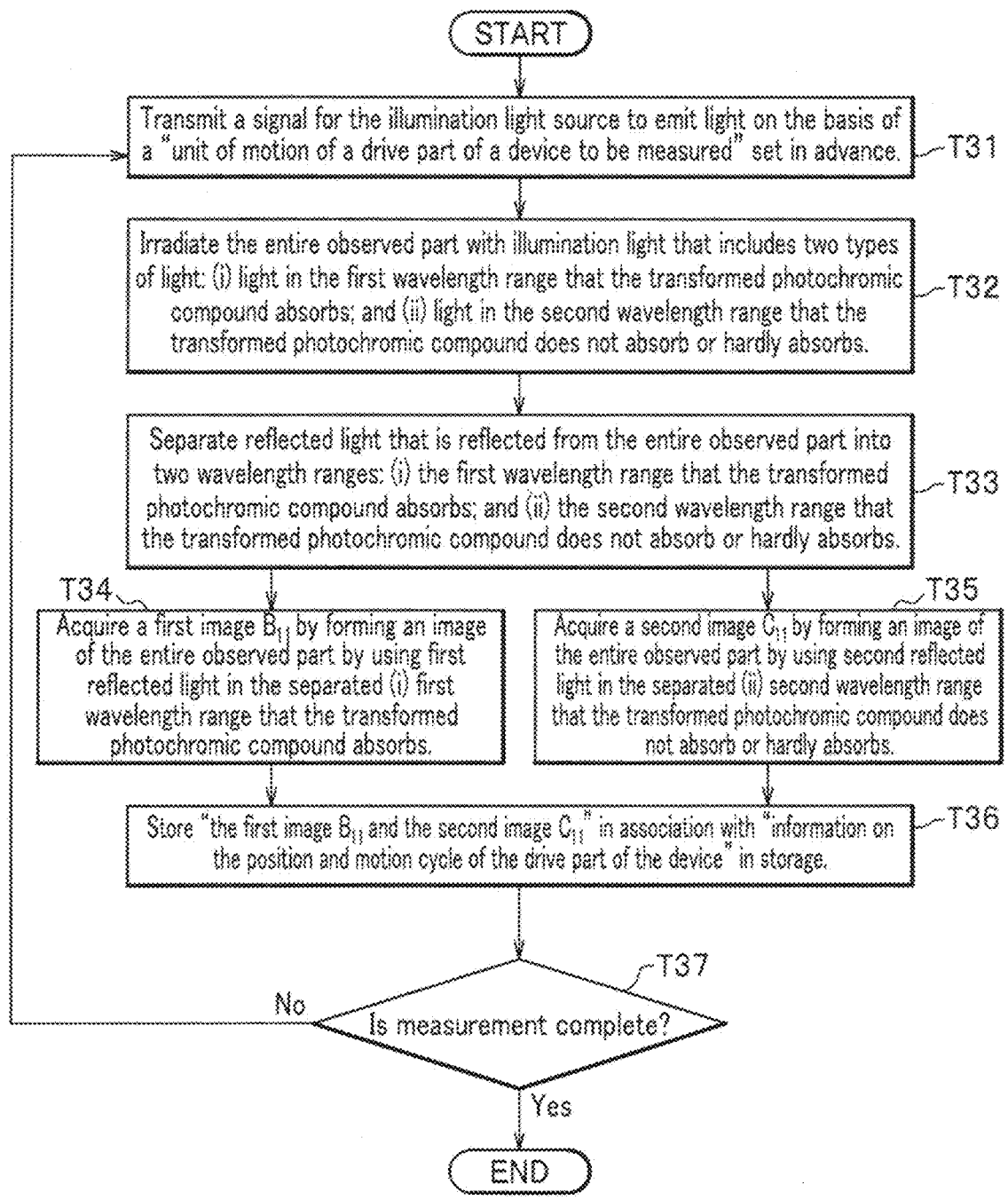
FIG. 11 is a flowchart showing a comparison-image capturing process of a fluid flow visualization system according to the first embodiment of the present invention.

The comparison-image capturing process (step T5) will be described with reference to FIG. 11.

First, the controller 16 of the visualization device 10 transmits a signal for the illumination light source 5 to emit light on the basis of a "unit of motion of a drive part (piston 21 in the current embodiment) of a device to be measured" set in advance (step T31). Upon receiving the signal, the illumination light source 5 irradiates the entire observed part with illumination light 32 that includes two types of light in different wavelength ranges (step T32). The two wavelength ranges are (i) a first wavelength range that the transformed photochromic compound absorbs and (ii) a second wavelength range that the transformed photochromic compound does not absorb or hardly absorbs. In this way, piston 21 that is at an image taking position is irradiated simultaneously with the first illumination light and the second illumination light.

Next, the separator unit 6 separates reflected light 33 that is reflected from the entire observed part into two wavelength ranges: (i) the first wavelength range that the transformed photochromic compound absorbs and (ii) the second wavelength range that the transformed photochromic compound does not absorb or hardly absorbs (step T33).

A first image $B_{11}$ that serves as a comparison image is acquired by forming an image of the entire observed part by using first reflected light $35_1$ in the separated (i) first wavelength range that the transformed photochromic compound absorbs (step T34).

A second image $C_{11}$ that serves as a comparison image is acquired by forming an image of the entire observed part by using second reflected light $35_2$ in the separated (ii) second wavelength range that the transformed photochromic compound does not absorb or hardly absorbs (step T35).

Next, the visualization device 10 stores "the first image $B_{11}$ and the second image $C_{11}$" in association with "information on the position and motion cycle of the drive pan of the device" in storage composed of image storage $11_1$, $11_2$ (step T36). Note that the set of information on the position and motion cycle is one example of time information. Whether to finish the measurement is then determined (step T37). The current process is terminated when the measurement is complete. If, on the other hand, the first image $B_{11}$ and the second image $C_{11}$ are to be acquired further, the procedure of steps T31-T36 is repeated over time. In this way, time series of first images $B_{11}$ and second images $C_{11}$ are acquired.

Figure 12:
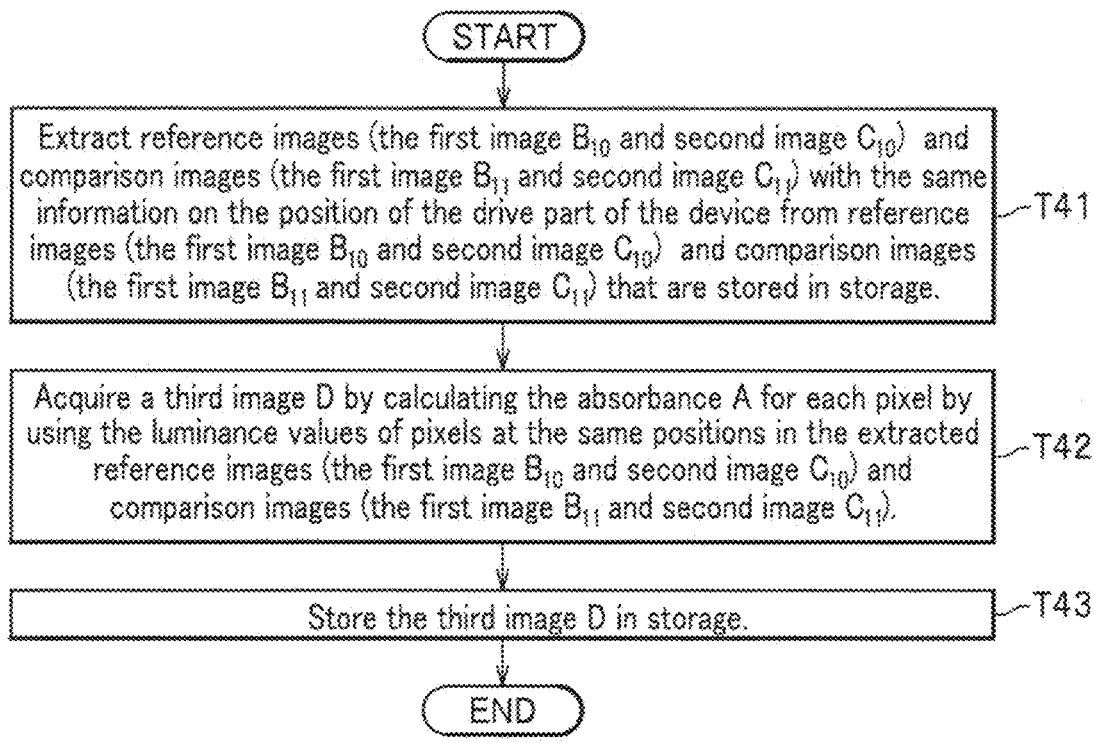
FIG. 12 is a flowchart showing an image processing process of a fluid flow visualization system according to the first embodiment of the present invention.

The image processing process (step T6) is described with reference to FIG. 12.

First, reference images (the first image $B_{10}$ and second image $C_{10}$) and comparison images (the first image $B_{11}$ and second image $C_{11}$) with the same information on the position of the drive part of the device are extracted from reference images (the first image $B_{10}$ and second image $C_{10}$) and comparison images (the first image B and second image $C_{11}$) that are stored in storage (step T41).

Next, a third image D is acquired by calculating the absorbance A for each pixel by using the luminance values of pixels at the same position in the extracted reference images (the first image $B_{10}$ and second image $C_{10}$) and comparison images (the first image $B_{11}$ and second image $C_{11}$) (step T42). The generated third image D is then stored in storage (not shown in figure) of the image processor 12 (step T43).

As described above, the fluid flow visualization system 1 according to the present embodiment captures the first image B of the fluid 23 using the first wavelength range where the amount of absorption of light changes and the second image C of the fluid 23 using the wavelength range where the amount of absorption of light does not change or hardly changes.

Because the amount of absorption of light of the photochromic compound transformed by the transformation-inducing light 31 is changed in the first wavelength range, the first images B taken over time show the distribution of the transformed photochromic compound within the fluid at each point in time. When there is a change in the state of the fluid (such as oil film thickness), the distributions of the transformed photochromic compound that appear in the first images B will reflect the effects of the change in state of the fluid 23.

Because the amount of absorption of light of the photochromic compound transformed by the transformation-inducing light 31 is not changed or is hardly changed in the second wavelength range, the second images C taken over time show the state of the fluid 23 at each point in time.

The visualization system 1 generates a third image D by using a first image $B_{10}$ and a second image $C_{10}$, taken of the fluid 23 before irradiation with the transformation-inducing light 31, and a first image $B_{11}$ and a second image $C_{11}$, taken of the fluid 23 after irradiation with the transformation-inducing light 31. The third image DI is calculated by taking the logarithms of the ratios of these images and calculating the difference between the two values.

There may be cases where there is a part (for example, an edge) where reflectivity differs for light in the first wavelength range and light in the second wavelength range, or cases where the distribution of light intensity differs for light in the first wavelength range and light in the second wavelength range due to, say, the use of two light sources (causing, for example, the upper pan of the first image to become bright and the lower part of the second image to become bright). Even in these cases, the first image $B_{10}$ taken before irradiation with transformation-inducing light and the first image $B_{11}$ taken after irradiation with transformation-inducing light, and the second image $C_{10}$ taken before irradiation with transformation-inducing light and the second image $C_{11}$ taken after irradiation with transformation-inducing light show the state of the fluid with light in the first wavelength range and the second wavelength range having substantially the same conditions.

For this reason, in the third image, not only is the effect of discoloration from dirt, scratches, and the like on a device reduced, but various noises caused by light such as the following are simultaneously reduced: noise arising from there being a part where reflectivity differs due to the difference in wavelengths of light in the first wavelength range and light in the second wavelength range, and noise arising from the difference in light intensity distributions of light in the first wavelength range and light in the second wavelength range. As a result, change in distribution of the colored, transformed photochromic compound appears more clearly. This makes it possible for the fluid flow visualization system 1 according to the present embodiment to clearly visualize the flow of a fluid 23, even in a measuring environment where the fluid is in a changeable state such as when the fluid is in a moving object or in a changing environment.

Note that in the conventional technique, white light was used to take images of a fluid. Images taken with white light reflect both the distribution of the transformed photochromic compound in a fluid at each point in time and the effects of the changes in the state of the fluid. Due to this, absorbance calculated from images taken with white light is not only affected by the change in the distribution of the transformed photochromic compound, but also by the changes in the state of the fluid. For this reason, the conventional technique found it hard to clearly visualize flow in a measuring environment where the fluid is in a changeable state such as when the fluid is in a moving object or in a changing environment.

Figure 13:
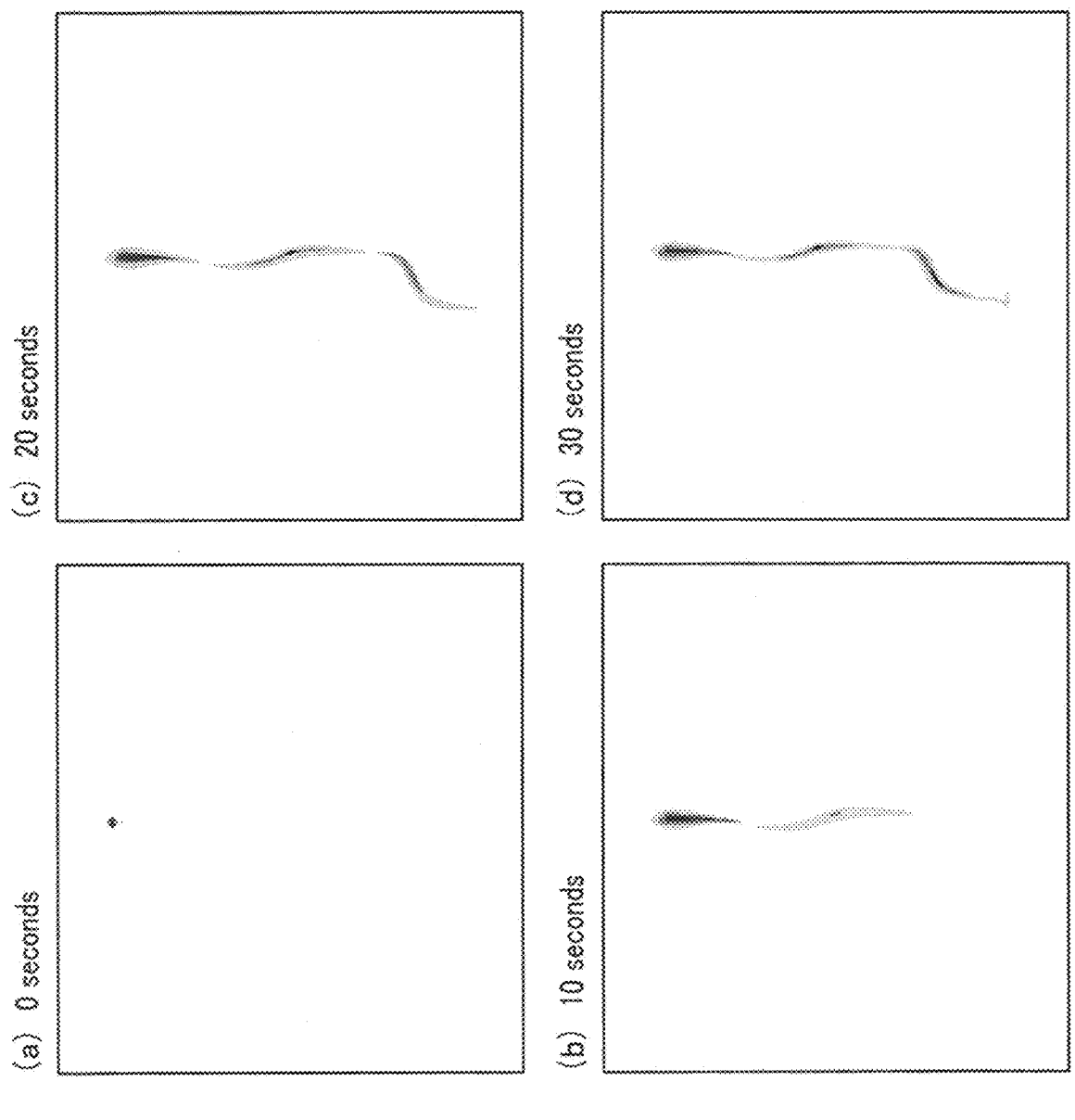
FIG. 13 shows third images generated by using a fluid flow visualization system according to the first embodiment of the present invention. The third images are generated from images taken of a lubricating oil over time while a piston remains stationary.

Concrete examples of the third images D generated from a visualization system 1 according to the present embodiment are shown in FIG. 13. The third images D in FIG. 13 have been generated from images of the fluid 23 taken over time while the piston 21 of FIG. 1 was stationary.

The photochromic compound used was a spiropyran-based compound called 1,3,3-Trimethylindolino-6'-nitrobenzopyrylospiran (Tokyo Chemical Industry Co., Ltd., product code: T0366), and ester oil was used as the fluid 23.

Ultraviolet light was used as the transformation-inducing light 31 for inducing photochromism of the photochromic compound. A nitrogen laser (a wavelength of 337 nm) or a YAG laser (the third harmonic, 355 nm, of a 1064 nm wavelength) was used as a transformation-inducing light source 3.

FIG. 13's (a) shows the third image D immediately after the transformation-inducing light 31 was emitted (0 sec). FIG. 13's (b) shows the third image D 10 seconds after emission. FIG. 13's (c) shows the third image D 20 seconds after emission. FIG. 13's (d) shows the third image D 30 seconds after emission. FIG. 13 shows absorbance in terms of gradations of color, with higher absorbance shown in darker shades.

Third images D show the change in distribution of the transformed photochromic compound with reduced effects of changes to the state of the fluid. This is evident from the images of FIG. 13 that clearly show the part irradiated with transformation-inducing light 31 (the part with high absorbance) moving downwards over time.

Second Embodiment

Configuration of Fluid Thickness Measuring Set

A fluid thickness measuring system (hereinafter a "thickness measuring system") is a system for measuring the thickness of a fluid for which measurement is taken. For example, the thickness measuring system measures the thickness of a lubricant (oil film thickness) that is used on a sliding surface of a moving object such as a piston, cylinder, and sliding bearing. Note that the thickness measuring system is one example of a fluid measurement system.

Figure 14:
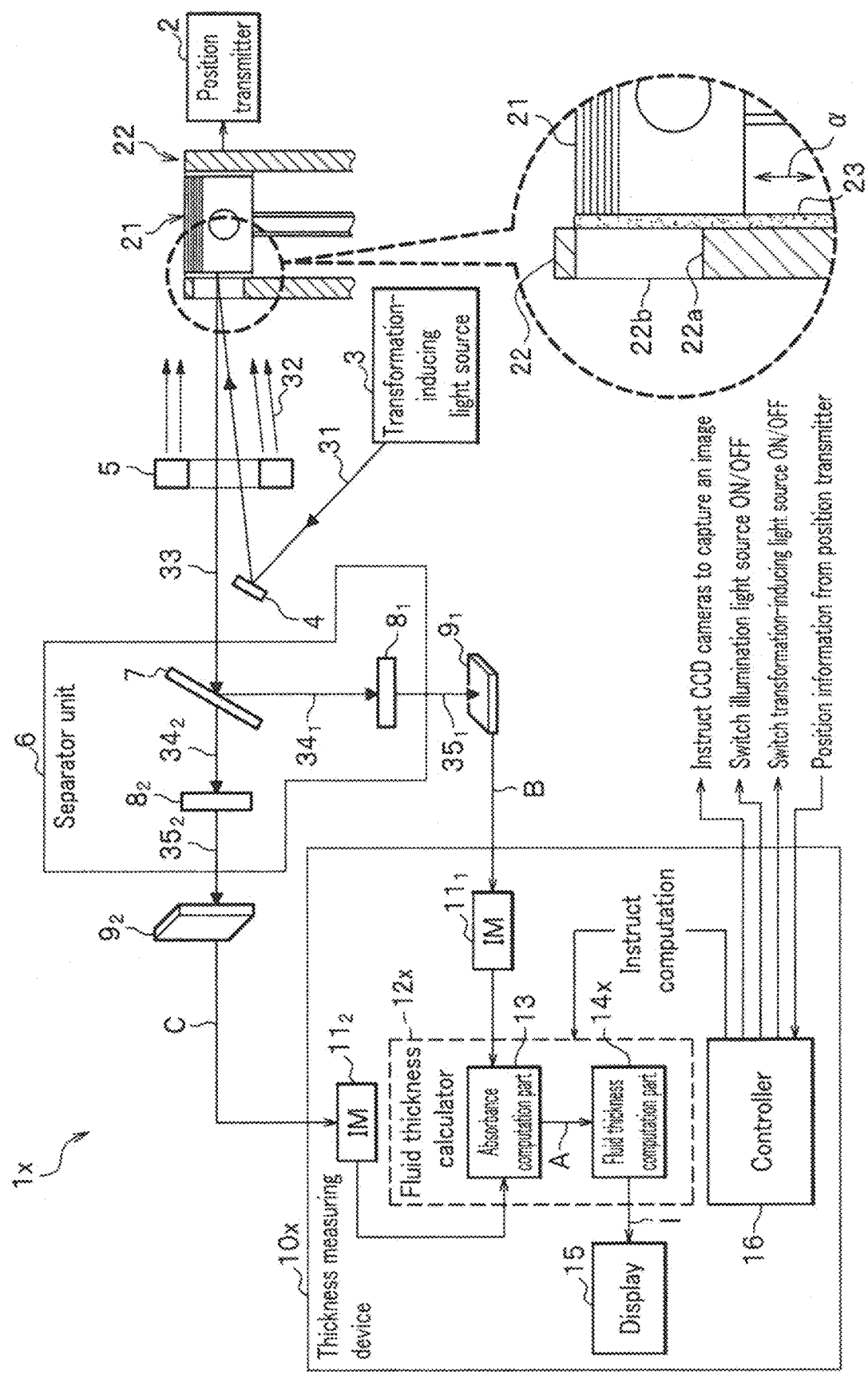
FIG. 14 is a schematic block diagram of a fluid flow visualization system according to a second embodiment of the present invention.

As shown in FIG. 14, a thickness measuring system $1x$ according to the present embodiment includes a position transmitter 2, a transformation-inducing light source 3, a mirror 4, an illumination light source 5, a separator unit 6, a pair of CCD cameras $9_1$, $9_2$, and a fluid thickness measuring device $10x$ (hereinafter a "thickness measuring device $10x$"). Note that components that are the same as those in the visualization system 1 (see FIG. 1) according to the first embodiment are denoted by the same reference symbols, and repeat descriptions of such components are avoided. Description will focus on the components having different functions. Note that a photochromic compound (not shown in figure) is dissolved in a fluid 23 as in the first embodiment.

The thickness measuring device $10x$ includes a pair of image storage $11_1$, $11_2$, a fluid thickness calculator $12x$, a display IS, and a controller 16. The fluid thickness calculator $12x$ includes an absorbance computation part 13 and a fluid thickness computation pan $14x$. Note that the thickness measuring device $10x$ is one example of a fluid measurement system.

The CCD cameras $9_1$, $9_2$ are devices for generating images of a fluid 23.

The CCD camera $9_1$ generates a first image B of the fluid 23 with the first reflected light $35_1$ (for example, light with wavelengths of around 490-540 nm) that has passed the bandpass filter $8_1$. The first image B here includes both an image taken before irradiation with the transformation-inducing light 31 and an image taken after irradiation with the transformation-inducing light 31. Hereinafter, the first image taken before irradiation with the transformation-inducing light 31 may be referred to as the "first image $B_{10}$", and the first image taken after irradiation with the transformation-inducing light 31 may be referred to as the "first image $B_{11}$", in the same way as in the first embodiment.

The CCD camera $9_2$ generates a second image C of the fluid 23 with the second reflected light $35_2$ (for example, light with wavelengths of around 580-680 nm) that has passed the bandpass filter $8_2$. The second image C here includes both an image taken before irradiation with the transformation-inducing light 31 and an image taken after irradiation with the transformation-inducing light 31. Hereinafter, the second image taken before irradiation with the transformation-inducing light 31 is referred to as the "second image $C_{10}$", and the second image taken after irradiation with the transformation-inducing light 31 is referred to as the "second image $C_{11}$", in the same way as in the first embodiment.

The thickness measuring device $10x$ is a device that measures the thickness of a fluid 23 from a first image B and a second image C generated by the CCD cameras $9_1$, $9_2$.

The image storage (IM) $11_1$ and the image storage (IM) $11_2$ are devices that store images generated by the CCD cameras $9_1$, $9_2$. The first image B that is generated by the CCD camera $9_1$ is stored in the image storage $11_1$, and the second image C that is generated by the CCD camera $9_2$ is stored in the image storage $11_2$. The image storage $11_1$ and the image storage $11_2$ are examples of the "first image storage" and the "second image storage". Note that the image storage $11_1$, $11_2$ can be a single device, in which case the first image B and the second image C are stored in image storage 11.

Because the first reflected light $35_1$ that has passed the bandpass filter $8_1$ is in the first wavelength range, the first image B taken at a particular point in time shows the distribution of the transformed photochromic compound in the fluid 23 at the particular point in time. When there is a change in the state of the fluid 23 (for examples, oil film thickness), the effects of the change in the state of the fluid is reflected in the distribution of the transformed photochromic compound shown in the first image B. On the other hand, because the second reflected light $35_2$ that has passed through the bandpass filter $8_2$ is in the second wavelength range, the second image C taken at a particular point in time shows the state of the fluid 23 at the particular point in time.

The fluid thickness calculator $12x$ acquires the first image B and the second image C from the image storage $11_1$, $11_2$, and calculates the thickness L (in the current embodiment, oil film thickness) of the fluid 23 using the acquired first image B and the second image C. The fluid thickness calculator $12x$ includes an absorbance computation part 13 and a fluid thickness computation part 14x. The fluid thickness calculator 12x is realized, for example, through program execution in a CPU (central processing unit), or with a dedicated circuit.

The function of the absorbance computation part 13 is the same as that in the first embodiment. To calculate absorbance, the absorbance computation part 13 uses the first image $B_{10}$ and the second image $C_{10}$, taken of the fluid 23 before irradiation with the transformation-inducing light 31, and the first image $B_{11}$ and the second image $C_{11}$, taken of the fluid 23 after irradiation with the transformation-inducing light 31. Absorbance is obtained by calculating the logarithms of the ratios of these images then calculating the difference between the two values.

For example, let the light intensity of a pixel that is included in a first image $B_{10}$ taken before irradiation by the transformation-inducing light 31 be defined as $11_0$, and the light intensity of a pixel that is included in a second image $C_{10}$ taken before irradiation by the transformation-inducing light 31 be defined as $12_0$. Similarly, let the light intensity of a pixel that is included in a first image $B_{11}$ taken after irradiation by the transformation-inducing light 31 be defined as $11_1$, and the light intensity of a pixel that is included in a second image $C_{11}$ taken after irradiation by the transformation-inducing light 31 be defined as $12_1$.

In this case, the absorbance computation part 13 calculates the absorbance A at each pixel using equation (2) shown below. Note that "LOG" indicates a common logarithm.

$$A=-\text{LOG}(I1_1/I2_1)-[-\text{LOG}(I1_0/I2_0)] \quad (2)$$

$$A=-\text{LOG}\,[(I1_1/I2_1)/(I1_0/I2_0)] \quad (2)$$

The fluid thickness computation part 14x calculates the thickness L of the fluid 23 based on the absorbance A that is calculated by the absorbance computation part 13. Let, for example, $\mu$ be the absorption coefficient of the fluid 23 after the photochromic compound is dissolved.

In this case, the fluid thickness computation part 14 uses the following equation (4) to calculate the thickness L of the fluid 23 at a pixel that represents the part that is to be measured.

$$L=A/\mu \quad (4)$$

The display 15 displays the thickness L of the fluid 23 calculated by the fluid thickness computation part 14x. Note that the display 15 may, as in the first embodiment, display a third image D as well. In other words, the fluid thickness calculator 12x includes the function of a 2-D pattern forming part 14 as described in the first embodiment, and the display 15 may display a third image D generated by the 2-D pattern forming part 14 together with the thickness L of the fluid 23. Also, when the entire fluid 23 observed through the fitting member 22b is irradiated with transformation-inducing light 31, absorbances A that make up the third image D can be converted into thicknesses L of the fluid 23 with equation (4) so that a distribution of the thicknesses L of the fluid 23 may be displayed.

Equation (4) given above is explained in more detail.

Figure 15:
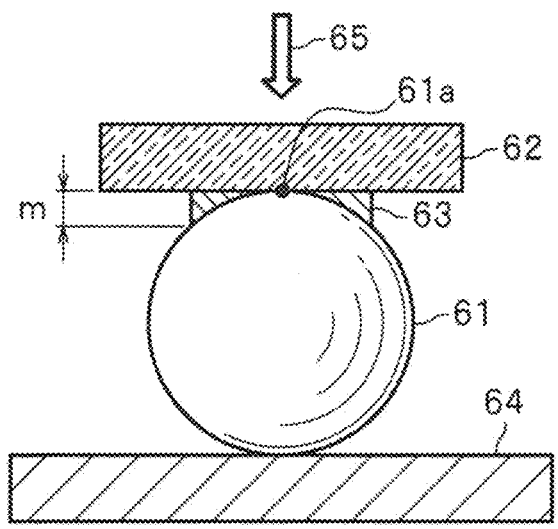
FIG. 15 shows an experimental setup for investigating a relationship between absorbance and fluid thickness.

Through conducting an experiment, the inventors of the present invention confirmed that absorbance is proportional to fluid thickness and that the relationship between absorbance and fluid thickness can be described with equation (4). The set-up used for the experiment is shown in FIG. 15. In order to investigate the relationship between film thickness and absorbance, a fluid of known thickness is required. As shown in FIG. 15, a metal ball 61 was made to come in contact with a flat glass plate 62 and the gap between them was filled with a test solution 63 in order to create known thickness. The thickness of the test solution 63 is the distance, m, between the metal ball 61 and the flat glass plate 62. If the diameter of the metal ball 61 is known, fluid thickness at a certain point away from the contact point 61a, the point of contact between the metal ball 61 and the flat glass plate 62, can be determined. The diameter of the metal ball 61 used in the experiments was 100 mm. Ester oil was used as the test solution 63. A spiropyran-based photochromic compound was dissolved in the test solution 63. The percent concentration of mass of the test solution 63 was 0.4 mass %. Note that the metal ball 61 was fixed to the base 64 to avoid movement.

Figure 16:
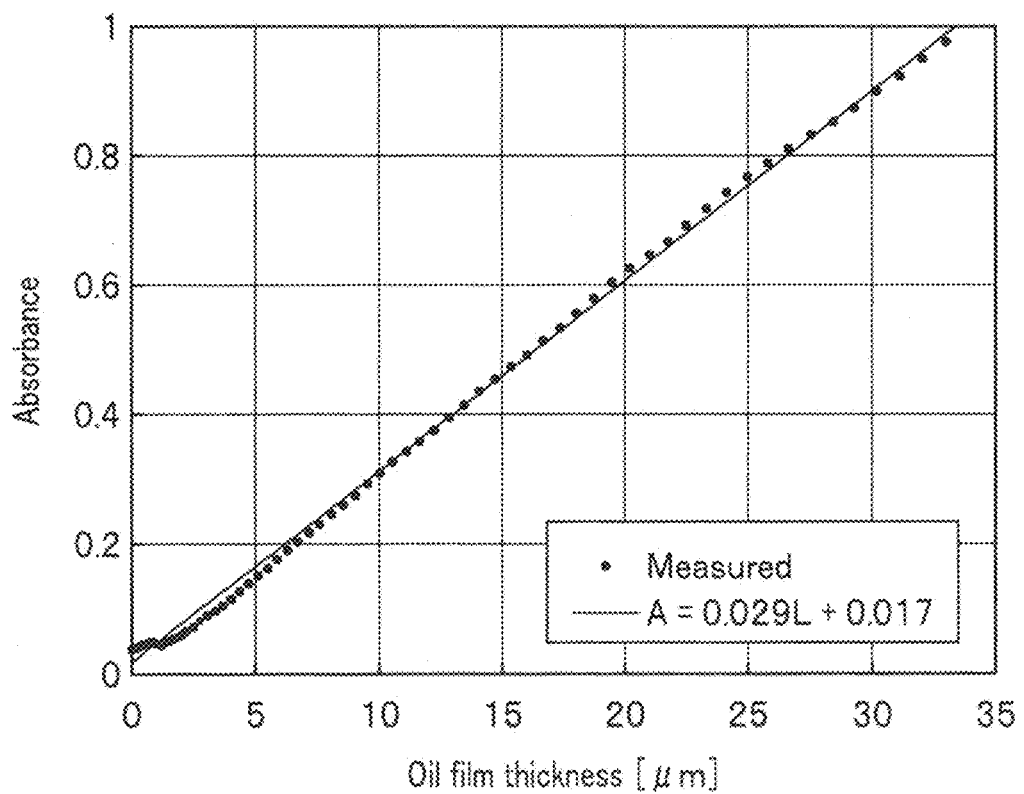
FIG. 16 is a graph showing the relationship between absorbance and fluid thickness.
Figure 17:
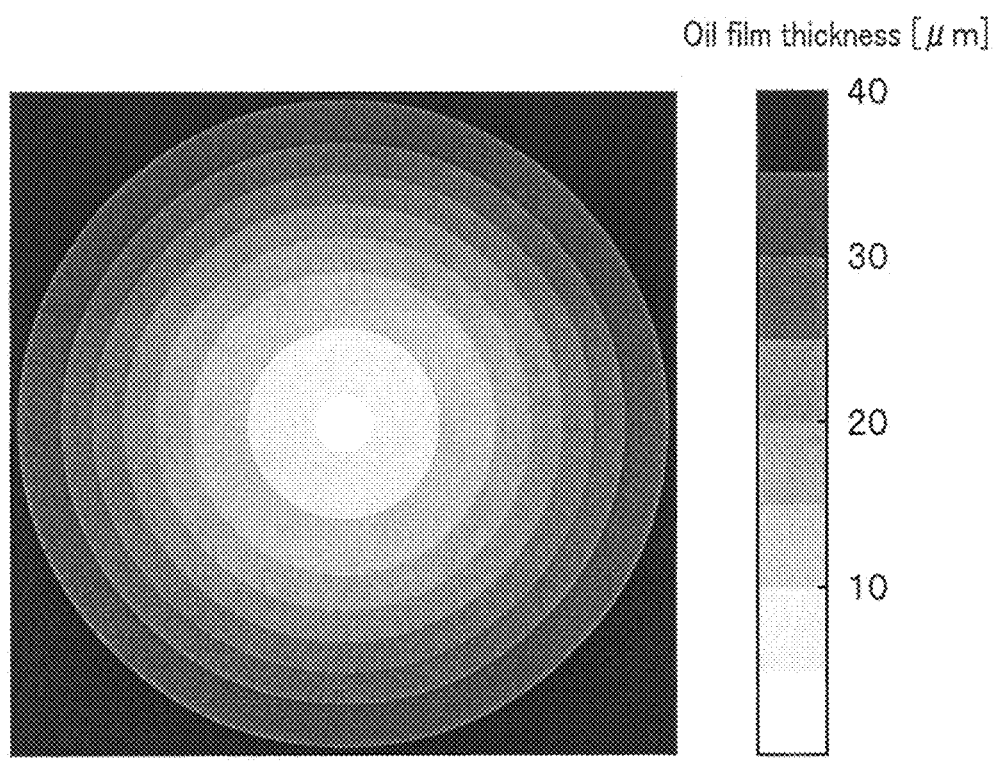
FIG. 17 shows a thickness distribution of a test solution calculated from an absorption coefficient obtained during the experiment.

Next, an ultraviolet LED lamp (not shown in figure) with a wavelength close to that of a nitrogen laser was used to sufficiently irradiate, in the direction shown by the symbol 65, the test solution 63 with light. The wavelength of light emitted by the ultraviolet LED lamp used in the experiment was 340 nm. In this way, the molecular structure of the photochromic compound acting as a dye that is dissolved in the test solution 63 is transformed, coloring the entire test solution 63. The test solution 63 need to be colored completely; if there are parts that remain untransformed, the relationship between fluid thickness and absorbance cannot be investigated. Then, in the same way as shown in FIG. 14, a separator unit 6 was used to take images from the direction indicated by symbol 65, and the absorbance A for each pixel was calculated using equation (2) given above. Experimental results are shown in FIG. 16. As shown in FIG. 16, absorbance increases linearly with the increase in fluid thickness (described in the figure as "oil film thickness"). In this experiment, the absorption coefficient $\mu$ of the test solution 63 dissolved with a photochromic compound was found to be approximately 0.03 from the linear approximation line. Note that the absorption coefficient $\mu$ is determined by factors such as the kind of test solution 63 and photochromic compound used and percent concentration of mass. The distribution of thickness of the test solution 63 calculated by using the absorption coefficient $\mu$ that was derived from the experiment is shown in FIG. 17. The center of FIG. 17 corresponds to the contact point 61a between the metal ball 61 and the flat glass plate 62 (see FIG. 15). FIG. 17 shows clearly how the thickness of the test solution 63 increases with distance from the contact point 61a.

Operation of Fluid Thickness Measuring System

Next, operation of the fluid thickness measuring system 1x of the present embodiment will be described with reference to FIG. 18 (also FIG. 14 as needed). Here, the operation will be described for a case where the thickness of the fluid 23 is measured by taking an image of the fluid 23 through the opening 22a when piston 21, the drive part, is stationary. Note that the operation of the thickness measuring system 1x described here is one example of a fluid measurement method.

Figure 18:
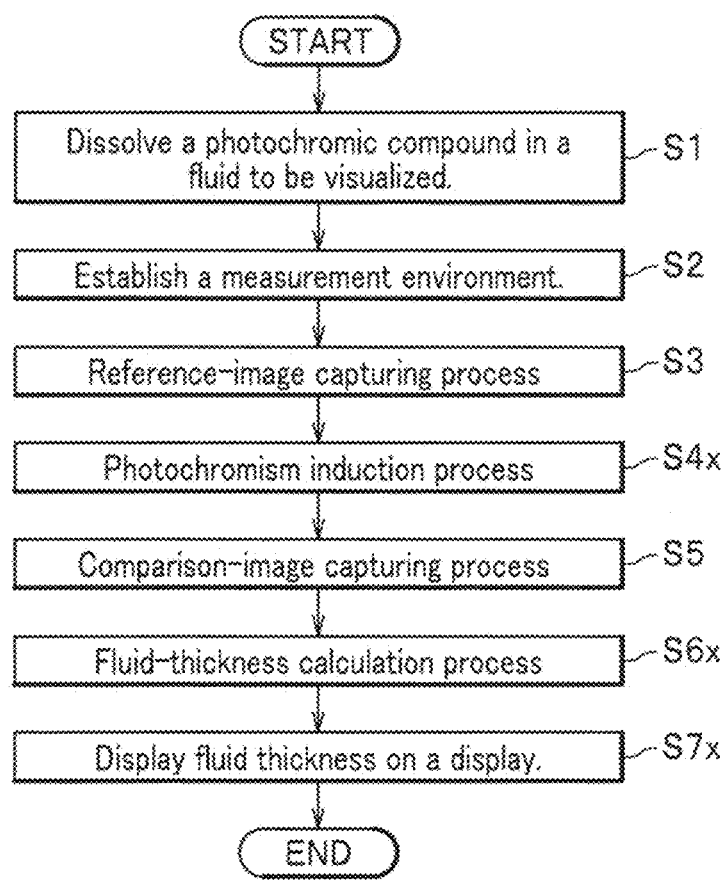
FIG. 18 is a flowchart showing an overall operation of a fluid thickness measuring system according to the second embodiment of the present invention.

FIG. 18 is a flowchart showing the overall operation of the thickness measuring system 1x. As shown in FIG. 18, the overall operation of the thickness measuring system x includes steps S1 to S7x. Steps S1, S2, S3, and S5 are the same as the operational steps of the first embodiment when the piston 21 is stationary (see FIG. 3). Description will focus on processes that differ, namely steps S4x, S6x, and S7x. Note that steps S1 and S2 correspond to the preparation process of the claims, step S3 corresponds to the pre-transformation imaging process of the claims, step S4x corresponds to the transformation-inducing irradiation process of the claims, and step S5 corresponds to the post-transformation imaging process of the claims.

Figure 19:
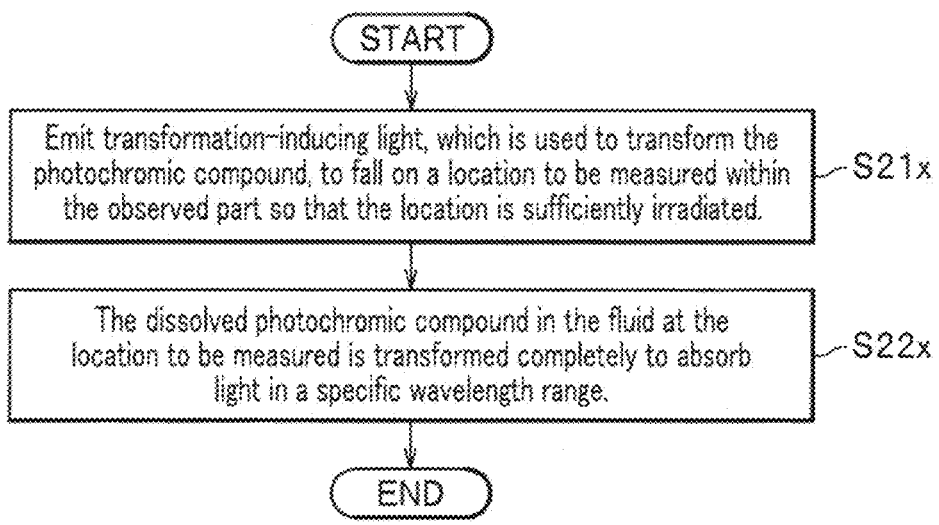
FIG. 19 is a flowchart showing a photochromism induction process of a fluid thickness measuring system according to the second embodiment of the present invention.

The photochromism induction process (step S4x) will be described with reference to FIG. 19.

In the process, the transformation-inducing light source 3 emits transformation-inducing light 31, which is used to transform the composition of a photochromic compound, to fall on a location to be measured within the observed part so that the location is sufficiently irradiated (step S21x). Sufficient irradiation means that the transformation-inducing light 31 reaches not only the surface of the fluid 23 but deep into the fluid 23 in the direction of thickness.

In this way, the dissolved photochromic compound in the fluid 23 at the location to be measured is completely transformed to absorb light in a specific wavelength range (step S22x). A complete transformation of a photochromic compound means that there are no untransformed portions remaining along the thickness direction of the fluid 23.

Figure 20:
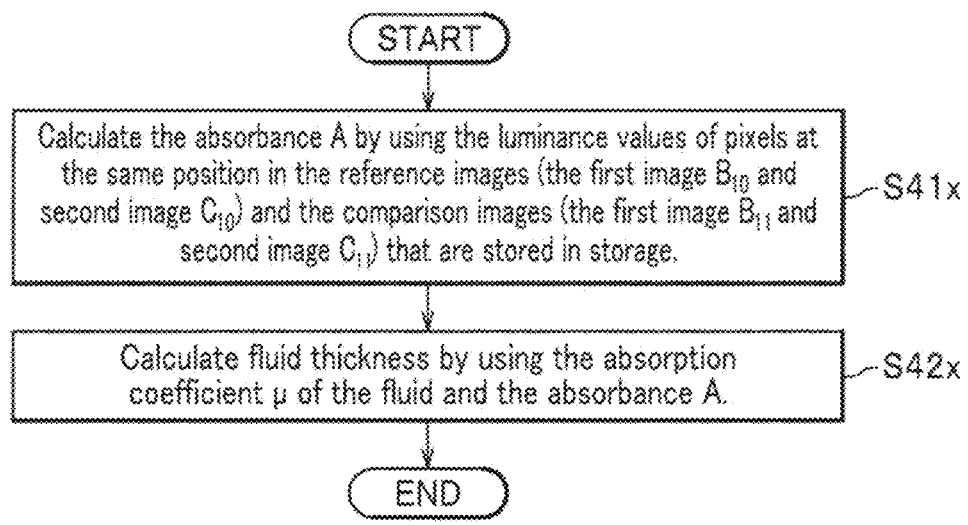
FIG. 20 is a flowchart showing a fluid-thickness calculation process of a fluid thickness measuring system according to the second embodiment of the present invention.

The fluid-thickness calculation process (step S6x) will be described with reference to FIG. 20.

In this process, absorbance A is calculated by using the luminance values of pixels at the same position in the reference images (the first image $B_{10}$ and second image $C_{10}$) and the comparison images (the first image $B_{11}$ and second image $C_{11}$) that are stored in storage (step S41).

Furthermore, in this process, the thickness L of the fluid 23 is calculated by using the absorption coefficient $\mu$ of the fluid 23 obtained in advance and the calculated absorbance A (step S42x). Next, the calculated thickness L of the fluid 23 is displayed on display 15 (step S7x of FIG. 18).

With the thickness measuring system 1x according to the second embodiment described above, substantially the same effects can be achieved as the second embodiment. In other words, due to reduced effects of various noises, fluid thickness L that is calculated by using the first image B and second image C becomes an accurate value.

Two embodiments of the present invention have been described above, but the present invention is not limited to these embodiments, and can be practiced otherwise within the scope of the appended claims.

In the first embodiment, the image processor 12 newly generates a third image D by acquiring a first image B and a second image C from the image storage $11_1$, $11_2$ and carries out image processing by using the acquired first image B and second image C. More specifically, the image processor 12 uses a first image $B_{10}$ and a second image $C_{10}$, taken of the fluid 23 before irradiation with the transformation-inducing light 31, and a first image $B_{11}$ and a second image $C_{11}$, taken of the fluid 23 after irradiation with the transformation-inducing light 31, to calculate the logarithms of the ratios of these images, then to calculate the difference between the two values to obtain absorbance, so that a two-dimensional pattern may be created out of the absorbance calculated for the individual pixels.

However, the image processor 12 may acquire from the image storage $11_1$ a first image $B_{11}$ that was taken of the fluid 23 after irradiation with the transformation-inducing light 31, and display the first image $B_{11}$ on display 15. The first images $B_{11}$ clearly show the distribution of the transformed photochromic compound in the fluid 23 at each point in time, and although not as good as the third images D of the present embodiment, can clearly visualize a measured object even in a measurement environment where the measured object is in a moving body or in a changing environment.

Furthermore, the image processor 12 may acquire from the image storage $11_1$ a first image $B_{11}$ that was taken of the fluid 23 after irradiation with the transformation-inducing light 31, and acquire from the image storage $11_2$ a second image $C_{11}$ that was taken of the fluid 23 after irradiation with the transformation-inducing light 31, and generate a third image D from these images.

In this case, the image processor 12 calculates the absorbance A1 at each pixel using equation (1) shown below, and creates a two-dimensional pattern out of the calculated results for the pixels. Note that $11_1$ denotes a light intensity of a pixel that is included in a first image $B_{11}$ taken after irradiation with the transformation-inducing light 31, and $12_1$ denotes a light intensity of a pixel that is included in a second image $C_{11}$ taken after irradiation with the transformation-inducing light 31. Note also that "LOG" indicates a common logarithm.

$$A1 = -LOG(I1_1/I2_1) \quad (1)$$

Since the first image $B_{11}$ and the second image $C_{11}$ taken at the same point in time show the fluid in the same state, with the same fluid surface movement, air bubble distribution, and so on, the third image D formed using the first image $B_{11}$ and the second image $C_{11}$ has various noises, including effects of change in the fluid's state such as fluid surface movement and air bubble distribution, reduced. As a result, the change in distribution of the colored, transformed photochromic compound appears more clearly.

Note that when there are parts where reflectivity differs due to the difference in wavelengths of light in the first wavelength range and light in the second wavelength range or when there are parts where there is a difference in light intensity distributions of light in the first wavelength range and light in the second wavelength range, these effects of light become reflected as various noises. For this reason, when various noises are generated from the effects of light in the first wavelength range and light in the second wavelength range, a third image D should be generated by using a first image $B_{10}$ and a second image $C_{10}$, taken of the fluid 23 before irradiation with the transformation-inducing light 31, and a first image $B_{11}$ and a second image $C_{11}$, taken of the fluid 23 after irradiation with the transformation-inducing light 31, as shown in the present embodiment.

The same goes for the fluid thickness calculator 12x of the second embodiment. The fluid thickness calculator 12x may use equation (1) given above to calculate the absorbance A1 from a first image $B_{11}$ and a second image $C_{11}$, and use equation (3) given below to calculate the thickness L of the fluid 23. Note that $\mu$ is the absorption coefficient of the fluid 23 after a photochromic compound has been dissolved.

$$L = A1/\mu \quad (3)$$

Furthermore, in the first embodiment, the fluid 23 that can be observed via an opening 22a is a lubricating oil intended to make a drive part move smoothly, and is therefore a liquid film (i.e., a thin film). However, when a surface of a fluid 23 is to be visualized, the fluid 23 can be a thick liquid. In other words, the thickness of the fluid 23 to be observed is not restricted.

Yet further, in the first embodiment, the separator unit 6 separates reflected light 33, which is light that is reflected when illumination light 32 falls on a fluid 23 (more precisely, light that is reflected from piston 21 after passing through the fluid 23), into a first wavelength range and a second wavelength range. However, if the observed part is configured to transmit light (for example, a fluid 23 is between a pair of glasses), the separator unit 6 may separate transmitted light into the first wavelength range and the second wavelength range, where transmitted light is illumination light 32 that has passed through the observed part. In other words, the separator unit 6 can be a unit that separates transmitted light that the fluid 23 has transmitted.

Yet further, although in the present embodiments, the drive part is assumed to be a piston 21, the drive part can be of any kind with a reciprocating or rotational motion. In other words, the drive part can be any drive part that can associate the position of the drive part with time.

REFERENCE SIGNS LIST

1 Visualization system (measurement system)
1x Thickness measuring system (measurement system)
2 Position transmitter
3 Transformation-inducing light source
4 Mirror
5 Illumination light source (lighting)
6 Separator unit
7 Image splitting dichroic mirror
8$_1$, 8$_2$ Bandpass filter
9$_1$, 9$_2$ CCD cameras (first imaging unit, second imaging unit)
10 Visualization device (measurement device)
10x Thickness measuring device (measurement device)
11$_1$, 11$_2$ image storage first image storage, second image storage)
12 Image processor
12x Fluid thickness calculator
13 Absorbance computation part
14 2-D pattern forming part
14x Fluid thickness computation part
15 Display
16 Controller
21 Piston (drive part)
22 Cylinder
23 Fluid

What is claimed is:

1. A fluid measurement method comprising:
   a preparation process of dissolving in a fluid a photochromic compound having an amount of absorption of light that changes upon irradiation with transformation-inducing light;
   a transformation-inducing irradiation process of irradiating the fluid with the transformation-inducing light that causes photochromism;
   a post-transformation imaging process of taking an image of the fluid after irradiation with the transformation-inducing light; and
   an image processing process,
   wherein
   the image processing process comes after the post-transformation imaging process,
   the post-transformation imaging process generates a first image by taking an image of the fluid by using first light in a first wavelength range in which an amount of absorption of light changes upon irradiation with the transformation-inducing light,
   the post-transformation imaging process further generates a second image of the fluid that is taken at the same time as the first image is taken,
   the second image is obtained using second light in a second wavelength range in which an amount of absorption of light does not change or hardly changes, and
   the image processing process generates a third image by using at least the first image and the second image.

2. The measurement method according to claim 1, wherein during the image processing process, the third image is generated by
   denoting a light intensity of a pixel that is included in the first image taken in the post-transformation imaging process by $I1_1$,
   denoting a light intensity of a pixel that is included in the second image taken in the post-transformation imaging process by $I2_1$,
   calculating an absorbance A1 at each of a plurality of pixels of the third image using equation (1) described as $A1=-LOG(I1_1/I2_1)$, and
   creating a two-dimensional pattern out of the calculated absorbance A1 for said each of the plurality of pixels.

3. The measurement method according to claim 1 further comprising a pre-transformation imaging process of taking an image of the fluid prior to irradiation by the transformation-inducing light, wherein
   the pre-transformation imaging process comes before the transformation-inducing irradiation process,
   the pre-transformation imaging process generates a fourth image by taking an image of the fluid by using the first light in the first wavelength range,
   the pre-transformation imaging process further generates a fifth image of the fluid that is taken at the same time as the fourth image is taken,
   the fifth image is obtained using the second light in the second wavelength range, and
   during the image processing process, the third image is generated by
   denoting a light intensity of a pixel that is included in the fourth image taken in the pre-transformation imaging process by $I1_o$,
   denoting a light intensity of a pixel that is included in the fifth image taken in the pre-transformation imaging process by $I2_o$,
   denoting a light intensity of a pixel that is included in the first image taken in the post-transformation imaging process by $I1_1$,
   denoting a light intensity of a pixel that is included in the second image taken in the post-transformation imaging process by $I2_1$,
   calculating an absorbance A at each of a plurality of pixels of the third image using equation (2) described as $A=-LOG(I1_1/I2_1)-[-LOG(I1_o/I2_o)]$, and
   creating a two-dimensional pattern out of the calculated absorbance A for said each of the plurality of pixels.

4. A fluid measurement method comprising:
   a preparation process of dissolving in a fluid a photochromic compound having an amount of absorption of light that changes upon irradiation with transformation-inducing light;
   a transformation-inducing irradiation process of irradiating the fluid with the transformation-inducing light that causes photochromism;
   a post-transformation imaging process of taking an image of the fluid after irradiation with the transformation-inducing light; and
   a fluid-thickness calculation process,
   wherein
   the fluid-thickness calculation process comes after the post-transformation imaging process,
   the post-transformation imaging process generates a first image by taking an image of the fluid by using first light in a first wavelength range in which an amount of absorption of light changes upon irradiation with the transformation-inducing light, the post-transformation imaging process further generates a second image of the fluid that is taken at the same time as the first image is taken, the second image is obtained using second light in a second wavelength range in which an amount of absorption of light does not change or hardly changes, and the fluid-thickness calculation process calculates a thickness of the fluid by using at least the first image and the second image.

5. The measurement method according to claim 4, wherein during the fluid-thickness calculation process, the thickness of the fluid is obtained by denoting a light intensity of a pixel that is included in the first image taken in the post-transformation imaging process by $I1_1$, denoting a light intensity of a pixel that is included in the second image taken in the post-transformation imaging process by $I2_1$, denoting an absorption coefficient of the fluid after the photochromic compound is dissolved by $\mu$, calculating an absorbance A1 at each of a plurality of pixels of an area irradiated with the transformation-inducing light using equation (1) described as $A1=-\mathrm{LOG}(I1_1/I2_1)$, and calculating a fluid thickness L of said each of the plurality of pixels using equation (3) described as $L=A1/\mu$.

6. The measurement method according to claim 4 further comprising a pre-transformation imaging process of taking an image of the fluid prior to irradiation by the transformation-inducing light, wherein the pre-transformation imaging process comes before the transformation-inducing irradiation process, there pre-transformation imaging process generates a fourth image by taking an image of the fluid by using the first light in the first wavelength range, the pre-transformation imaging process further generates a fifth image of the fluid that is taken at the same time as the fourth image is taken, the fifth image is obtained using the second light in the second wavelength range, during the fluid-thickness calculation process, the thickness of the fluid is obtained by denoting a light intensity of a pixel that is included in the fourth image taken in the pre-transformation imaging process by $I1_0$, denoting a light intensity of a pixel that is included in the fifth image taken in the pre-transformation imaging process by $I2_0$, denoting a light intensity of a pixel that is included in the first image taken in the post-transformation imaging process by $I1_1$, denoting a light intensity of a pixel that is included in the second image taken in the post-transformation imaging process by $I2_1$, denoting an absorption coefficient of the fluid after the photochromic compound is dissolved by $\mu$, calculating an absorbance A at each of a plurality of pixels of an area irradiated with the transformation-inducing light using equation (2) described as $A=-\mathrm{LOG}(I1_1/I2_1)-[-\mathrm{LOG}(I1_0/I2_0)]$, and calculating a fluid thickness L of said each of the plurality of pixels using equation (4) described as $L=A/\mu$.

* * * * *